(12) United States Patent
Sheldon

(10) Patent No.: US 7,716,703 B2
(45) Date of Patent: May 11, 2010

(54) DAYPART GUIDE WORKFLOW

(75) Inventor: Andrew K. Sheldon, Redwood City, CA (US)

(73) Assignee: Microsoft Corporation, Redmond, WA (US)

(*) Notice: Subject to any disclaimer, the term of this patent is extended or adjusted under 35 U.S.C. 154(b) by 1585 days.

(21) Appl. No.: 10/653,383

(22) Filed: Sep. 2, 2003

(65) Prior Publication Data
US 2005/0050070 A1    Mar. 3, 2005

(51) Int. Cl.
| | |
|---|---|
| H04N 7/10 | (2006.01) |
| H04N 7/025 | (2006.01) |
| H04N 5/445 | (2006.01) |
| H04N 7/173 | (2006.01) |
| G06F 3/00 | (2006.01) |
| G06F 13/00 | (2006.01) |
| H04H 20/14 | (2008.01) |
| H04H 60/29 | (2008.01) |
| H04N 7/16 | (2006.01) |

(52) U.S. Cl. .............. 725/44; 725/34; 725/35; 725/40; 725/42; 725/59; 725/86; 725/91; 725/98; 725/109; 725/144

(58) Field of Classification Search ................ 707/100; 725/39, 40, 42, 44, 34–35, 59, 86, 91, 98, 725/109, 144
See application file for complete search history.

(56) References Cited

U.S. PATENT DOCUMENTS

| | | | |
|---|---|---|---|
| 5,631,903 A * | 5/1997 | Dianda et al. ................. | 725/98 |
| 6,177,931 B1 * | 1/2001 | Alexander et al. ............ | 725/42 |
| 6,564,380 B1 * | 5/2003 | Murphy ....................... | 725/91 |
| 7,080,400 B1 * | 7/2006 | Navar .......................... | 725/139 |
| 7,103,904 B1 * | 9/2006 | Blackketter et al. .......... | 725/42 |
| 7,266,833 B2 * | 9/2007 | Ward et al. ................... | 725/42 |
| 2002/0188944 A1 * | 12/2002 | Noble ........................... | 725/39 |
| 2003/0005429 A1 * | 1/2003 | Colsey ......................... | 725/8 |
| 2003/0084449 A1 * | 5/2003 | Chane et al. ................. | 725/40 |
| 2004/0194131 A1 * | 9/2004 | Ellis et al. ..................... | 725/34 |
| 2005/0050218 A1 * | 3/2005 | Sheldon ........................ | 709/231 |

OTHER PUBLICATIONS

"The OPA White Papers: The Existence and Characteristics of Dayparts on the Internet", vol. 1, No. 3, Jan. 2003.*

* cited by examiner

*Primary Examiner*—Christopher Kelley
*Assistant Examiner*—Randy Flynn
(74) *Attorney, Agent, or Firm*—Lee & Hayes, PLLC

(57) ABSTRACT

Advertising templates, and request for corresponding multimedia programs that are available for distribution to third parties during a time period, are transmitted to content providers who respond by sending ad elements corresponding to the advertising templates. Daypart guides showing particular ad elements are designed for a particular headend and daypart. Each daypart guide is available to viewers serviced by the particular headend only during the time of day corresponding to the daypart. Viewers of the daypart guide select one of the ad elements each of which is navigationally linked to a display request page for the corresponding multimedia program from which the viewer can request to initiate a real time distribution thereof.

38 Claims, 14 Drawing Sheets

DAYPART GUIDE WORKFLOW

TECHNICAL FIELD

The present invention relates generally to audio-video entertainment systems, and more particularly to the advertisement of video delivery services to viewers such as video on demand and pay per view.

BACKGROUND

Multimedia home entertainment is desirable to consumers who seek out new kinds of listening and viewing content that are made available through a variety of communication media, including wireless broadcast and cable systems. Two such forms of multimedia home entertainment are pay per view (PPV) and video-on-demand (VOD) services. Each service offers a viewer a video (e.g., a motion picture) that is delivered for viewing by the viewer who orders and pays for the viewing. The VOD service offers the viewer a video that can be requested at any time and is available for viewing at the discretion of the viewer. Each service can be offered and delivered by wireless communication, such as satellite or cellular telephone services, or by wired communication, such as a cable television service.

Both the PPV service provider and the VOD service provider are referred to herein as a video delivery service provider, a network operator (netop) or a multisystem operator (MSO). The MSO offers video delivery services to viewers via a communication system by the distribution of PPV assets and/or VOD assets, which are collectively and individually referred to here as video assets. Examples of video assets include movies, TV shows, special interest programming, etc. Video assets are obtained from a content provider or other service having ownership rights in the video assets. The video delivery service provider, in turn, has received distribution rights from the content provider. As an enticement to the viewer, the content provider may provide an advertisement about a video asset. This advertisement may be used by the MSO to create a visual link from a homepage or storefront that can be viewed by the viewer. When the visual link is selected by the viewer, a distribution of the video asset to the viewer can be initiated.

It can be expected that the satellite and cable industry will continue to transition from linear channel programming to more content available on an on demand basis. A consequence of this transition is that more VOD and PPV assets, and advertisements therefore, will become available for distribution to viewers. With the addition of content available in an on demand basis, the convenience and user-friendliness of navigation by the viewer to VOD and PPV assets that the viewer would mostly likely purchase is of increasing importance.

Known trends exist for viewing audiences in television watching. These trends are often characterized by parts of the television day, or 'dayparts'. Television dayparts normally include morning, daytime, early fringe, primetime, and late fringe. Saturday and Sunday include special categories such as access and late night. Primetime is an example of a television daypart, defined as 8-11 PM EST Monday through Saturday, and 7-11 PM EST on Sunday. Primetime generally offers access to the widest variety of viewers. The advertising industry uses a finely honed principal of content targeting and promotion to attract the greatest audience for each consecutive daypart.

A present drawback to the content provider, the MSO, and to television viewing audiences is that content that the television viewing audiences would mostly likely purchase, according to known daypart trends, is not readily pointed out by targeted advertising to the television viewing audiences. Moreover, finding and navigating to VOD and PPV assets that a viewer would mostly likely purchase is neither convenient nor user-friendly. It would be an advantage in the art to provide such capabilities for both timely asset promotion and logical and timely navigation assistance so as to provide a benefit to the content provider, the MSO, and to television viewing audiences.

The creation of advertisements or promotions for VOD and PPV assets, as well as other products and services, entails production time and management for both the advertiser (e.g., a video asset content owner, product seller, or service provider) and the MSO (or its designated third party video asset aggregator). The various tasks necessary for a MSO to make one or more requests of the advertiser for the video asset(s), and any interactive advertisements supporting the same, requires significant coordination and communication between these two or more parties. The structure of a broadcast carousel at a headend of an MSO and common navigation controls made available for use by a viewer in order to select a video asset for viewing on a viewer input device (such as Home and Back buttons) must be communicated to a designer of an interactive ad. This complication is significantly compounded by the normal business factors that constitute the MSO business operations. These normal MSO business operations include, but are not limited to, multiple headend locations, variations in headend infrastructure, disparate video delivery servers and back office systems, multiple content partners, different subscriber access rules, large disparities in video asset usage and license rights, and multiple video asset viewing windows. The coordinating of the distribution of video assets to viewers, each of which can have complicated content ownership rights and distribution rights, can be a difficult and complicated task to perform by the MSO. There is, at present, an absence of automation tools to facilitate communication between several video asset owners partnered with an MSO. This lack of automated communication makes the tasks of collecting and scheduling video assets and interactive advertising at each appropriate headend somewhat hindered. This hindrance diminishes the ability of the MSO to use interactive advertising as a vehicle to promote video assets, particularly during a relevant daypart, so as to increase video delivery buy rates by viewers. It would be advantageous to provide systems and other tools to implement such an automated communication.

SUMMARY

Communications are automated between video asset owners and a multisystem operator (MSO) who provides video delivery services. These communications coordinate the distribution of video assets in accordance with content ownership and distribution rights granted from each video asset owner to the MSO. The automated communication can be used by the MSO and the video asset owners to create guides that feature advertising that is displayed during specific dayparts and from which viewers can select video assets for distribution from a headend. This automated communication system enables the video asset owners and the MSO to accomplish their respective tasks by accessing a single system.

An MSO determines assets to advertise during different dayparts of a viewing period according to those assets that have been made available to the MSO by video asset owners during a particular license time period. An operator, on behalf of the MSO, sends advertisement templates to the content owners requesting advertising (ads) that conform to the templates. Each video asset owner can then service the request by sending ads that conform to the template. The MSO receives the ads and forms them into various daypart guides that advertise the video assets that viewers of each headend during each daypart are likely to want to watch. The daypart guides can then be scheduled for deployment to each headend for distribution to viewers according to the time of day with respect to a daypart or portion thereof. The daypart guide thus reaches viewers with ads for VOD assets that the viewers are likely to want to watch during the time of day of the particular daypart.

BRIEF DESCRIPTION OF THE DRAWINGS

A more complete understanding of the implementations may be had by reference to the following detailed description when taken in conjunction with the accompanying drawings wherein.

Figure 1:
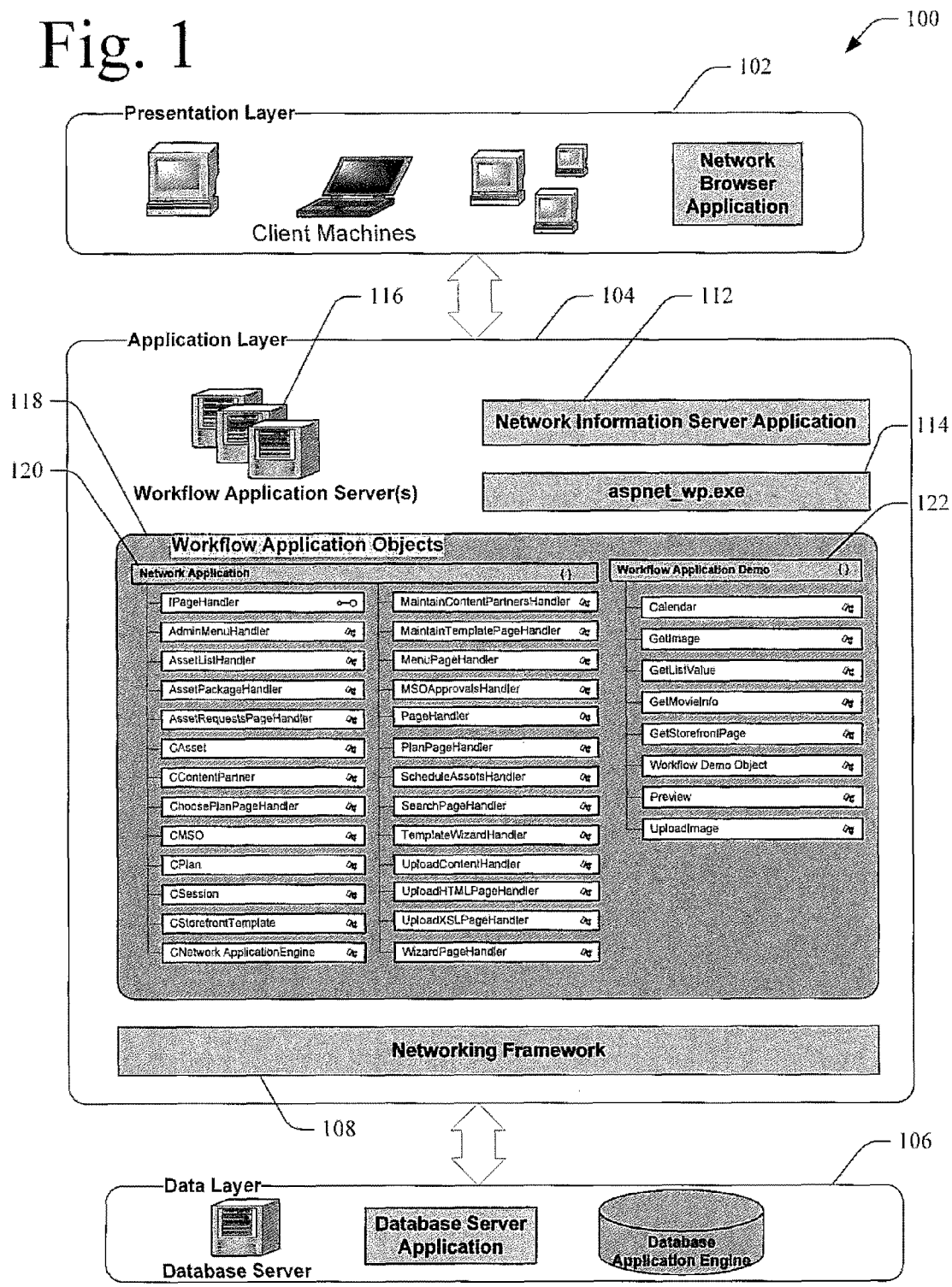
FIG. 1 depicts an exemplary environment having components for implementations in which client machines communicate using a network browser with an application layer for video delivery workflow servers, where the application layer includes various workflow application objects, where the application layer interfaces with a data layer executing on a database server, and where the database layer includes a database server application and a database application engine.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A workflow tool enables a multisystem operator (MSO) to select and promote certain video on demand (VOD) and pay per view (PPV) assets via carousel-based daypart pages, such as Managed Content Service (MCS) pages. The daypart promotional pages automatically update based on the time of day that a viewer accesses the daypart guide, such as through the viewer's homepage. The daypart guide can be set separately for each headend or region so as to accommodate different time zones. The daypart guide provides the viewer with logical and timely navigation assistance to the assets that are advertised in the daypart guide.

The workflow tool is used by content owners (or third party designates) to create advertising (ad) elements that conform to a size specified by a multisystem operator (MSO) to the content owners who in turn deliver the ad elements to the MSO. The work flow tool is web-based to allow convenient scheduling of ad elements into a predetermined daypart guide template on one or more pages within a carousel that serves a specific headend. A group of ad elements, or a single ad element, may constitute the daypart guide for any one given time of the day. When a viewer selects a specific ad element, a navigation will be initiated to link to a page that is related to the selected ad element. The linked page can be a static page such as a storefront that describes a VOD content and may offer a preview together with a way to purchase or view the corresponding VOD asset.

The daypart guide can be scheduled hours, days or weeks in advance of the required viewing during a viewing period. The daypart guide itself can be updated each time a web crawler, within a broadcast carousel engine, crawls a site. Expired daypart guides can be returned to the staging area for the carousel and can be either archived for subsequent use or deleted from the server where the daypart guides are stored. A group of ad elements can be given a group identity (ID) and then recalled by the ID as a single entity for the convenience of subsequent reuse.

In one implementation, the workflow tool can be provided in a web-based environment for a MSO to plan, communicate, receive, review and schedule video daypart guide pages to accompany video assets for each headend or group of headends. The workflow tool can be used by the MSO to increase the buy rate among viewers of a video delivery service that provides video assets to viewers, such as advertising videos, video-on-demand (VOD), pay per view (PPV) services, and static displays like video storefronts. The workflow tool provides a password protected log in for both the MSO and video asset owners. The workflow tool provided to the MSO allows the MSO to create a daypart guide within a specified daypart (or portion thereof that is within a time period or 'viewing window'.

Video asset owners determine which of their video assets that they will make available for distribution by way of a license for the given period or 'viewing period'. These video assets will then be uploaded into a database accessible to the MSO. A search conducted by the MSO returns those video assets that fall within a time period that is specified by the MSO. The MSO then selects from among those video assets that are available to license. The MSO then communicates the selections in a communication that is sent over a network (e.g., the Internet) to each video asset owner corresponding to the selected video assets.

The video asset owner, upon receipt of the communication from the MSO, is alerted by the workflow tool that a request for a video asset is pending. The video asset owners can then respond to the request by communicating back to the requesting MSO advertising elements (ad elements) for each requested video asset. The MSO can then use the ad elements to design a daypart guide using a daypart guide template. A daypart guide can be designed for each daypart, or portion thereof, during the viewing period that has been authorized by the corresponding video asset owners.

The workflow tool provides control over two distinct servers—a staging and preview server and a production server. VOD assets are reviewed and scheduled by daypart on the staging server by the operator for the MSO. Each video asset is then given a window for viewing on the production server. The window for viewing, or viewing period, may include a plurality of dayparts over several days, just one daypart, or only a portion of a daypart. The workflow tool then automatically transfers the approved video asset over to the production server and removes expired assets from the production server to the staging server for subsequent archival or deletion. A daypart guide for each daypart, or portion thereof, is similarly transferred so as to be made available for viewing by viewers both during the relevant viewing period and the daypart therein. For ease of navigation, the daypart guide can be all or a part of a homepage that is made available to a viewer each time that the viewer powers up their client device, set top box, or other video receiver, or when the viewer inputs a demand to see the homepage.

When the viewer views a daypart guide during particular time of day, the daypart guide that is seen by the viewer is one that is distributed to the viewer during a particular daypart that corresponds to the particular time of day. The daypart guide displays one or more selectable video on demand (VOD) ads. When the viewer selects one of the VOD ads, a video storefront for the selected VOD ad is displayed. The viewer can then input a request to the video storefront display to watch the corresponding VOD. Such a request is usually accompanied with an electronic payment transaction. Upon the request, and optionally the electronic payment transaction, the viewer receives a real time distribution of the VOD.

Two interfaces are depicted in FIG. 1 between three layers of an exemplary workflow tool 100 for a video delivery service that uses daypart guides. A presentation layer 102 interfaces with an application layer 104 and a data layer 106 interfaces with the application layer 104. The presentation layer 102 embodies client machines that access the application layer through a browser application, such as a browser application communicating over a network like the Internet.

The application layer 104 is in communication with the presentation layer 102 by a network connection to one or more servers 116 that execute workflow objects 118 in a network application 120 and in a workflow application demonstration 122. The network application 120 contains numerous modules that fulfill parts of an entirely interactive part of the workflow tool 100. The workflow application demonstration 122 contains specific data and routines that store procedures integral to the workflow tool 100.

A network information server application 112 also executes on the one or more servers 116. The application layer 104 can be based upon the ".NET" networking framework 108 as provided by the Microsoft Corporation of Redmond, Wash., USA. As such, instead of requiring each MSO or video asset owner to interact with an application or a single Web site, the NET framework will connect each operator of the workflow tool 100 to an array of computers and services that will exchange and combine objects and data. The application layer 104 also includes an application 114 for "aspnet_wp.exe" that embodies a set of technologies that constitute a framework for building Web applications and XML Web services. The application 114 processes HTTP requests (Web requests) and can include Web pages, XML Web services, HTTP handlers, and HTTP modules. The data layer 106 is in communication with the application layer 104 by a network connection to a database server that executes a database server application and a database application engine.

The software installation for implementations of workflow tool 100 include a light software installation of a network browser at the presentation layer 102 resident at the video asset owners, and an extensive software installation at application layer 104 for use by an operator of an MSO. A lesser software installation than at application layer 104 is desirable at data layer 106 for each headend of the MSO.

Figure 2:
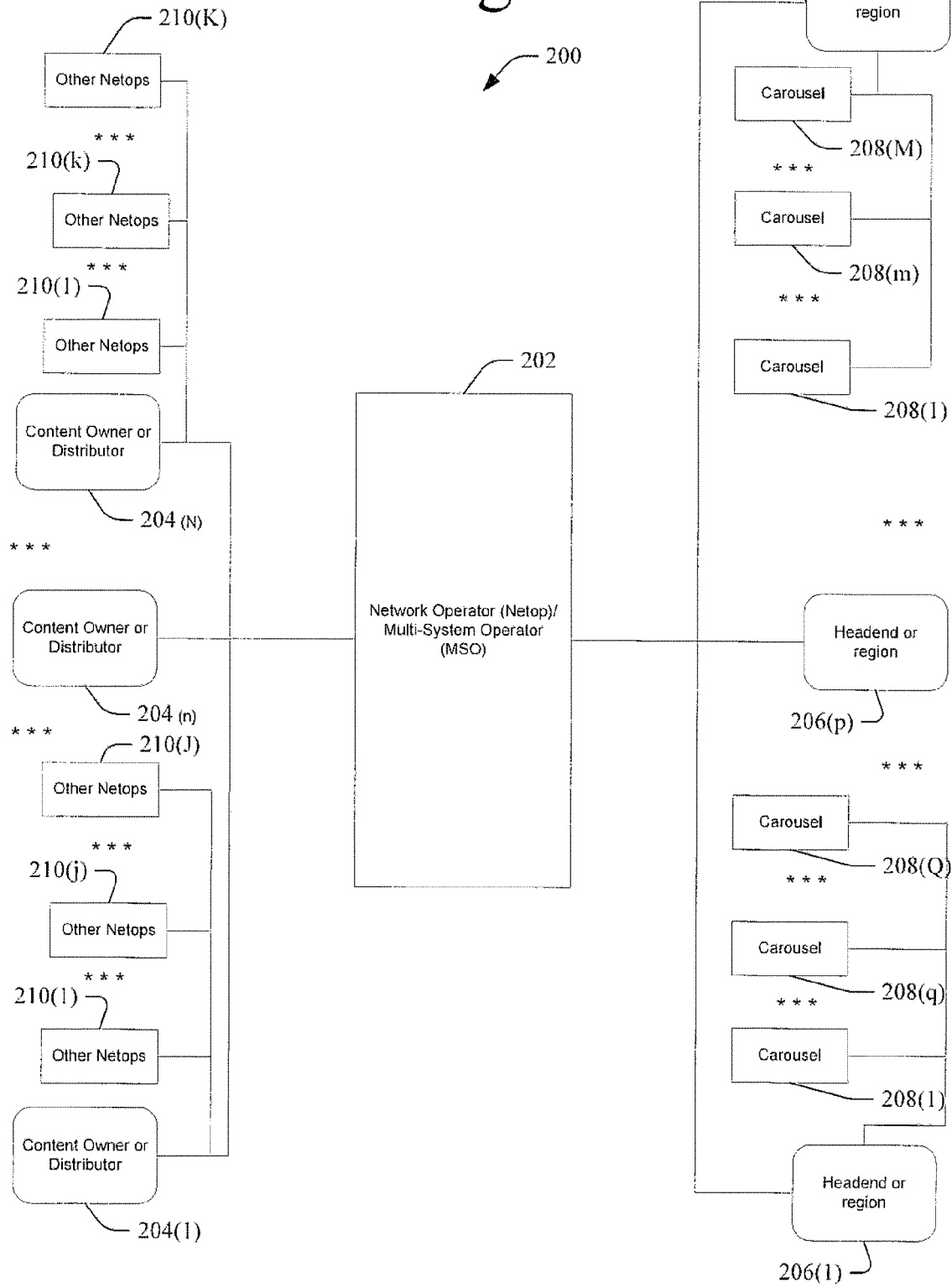
FIG. 2 is a block diagram depicting an exemplary environment in which a multisystem operator interfaces with a plurality of video asset owners and with a plurality of headends.

An exemplary environment 200 is seen in FIG. 2 in which an MSO 202 is in communication with a plurality of video asset owners 204(*n*), each of which can be in communication with one or more other network operators (netops) 210(*j*). Each netop 210(*j*) can be a provider of video delivery services—an end to end technical service for delivering of video assets. For example, a netop 210(*j*) can be a cellular telephone service provider that enables a video-telephone user to watch a VOD asset on the video-telephone via the end to end delivery of content by the cellular telephone service provider.

The MSO 202 is depicted as being in communication with a plurality of headends or regions 206(*p*), each of which is in communication with one or more carousels 208(*q*). The workflow tool 100 seen in FIG. 1 can perform in various implementations in the environment 200.

Figure 3:
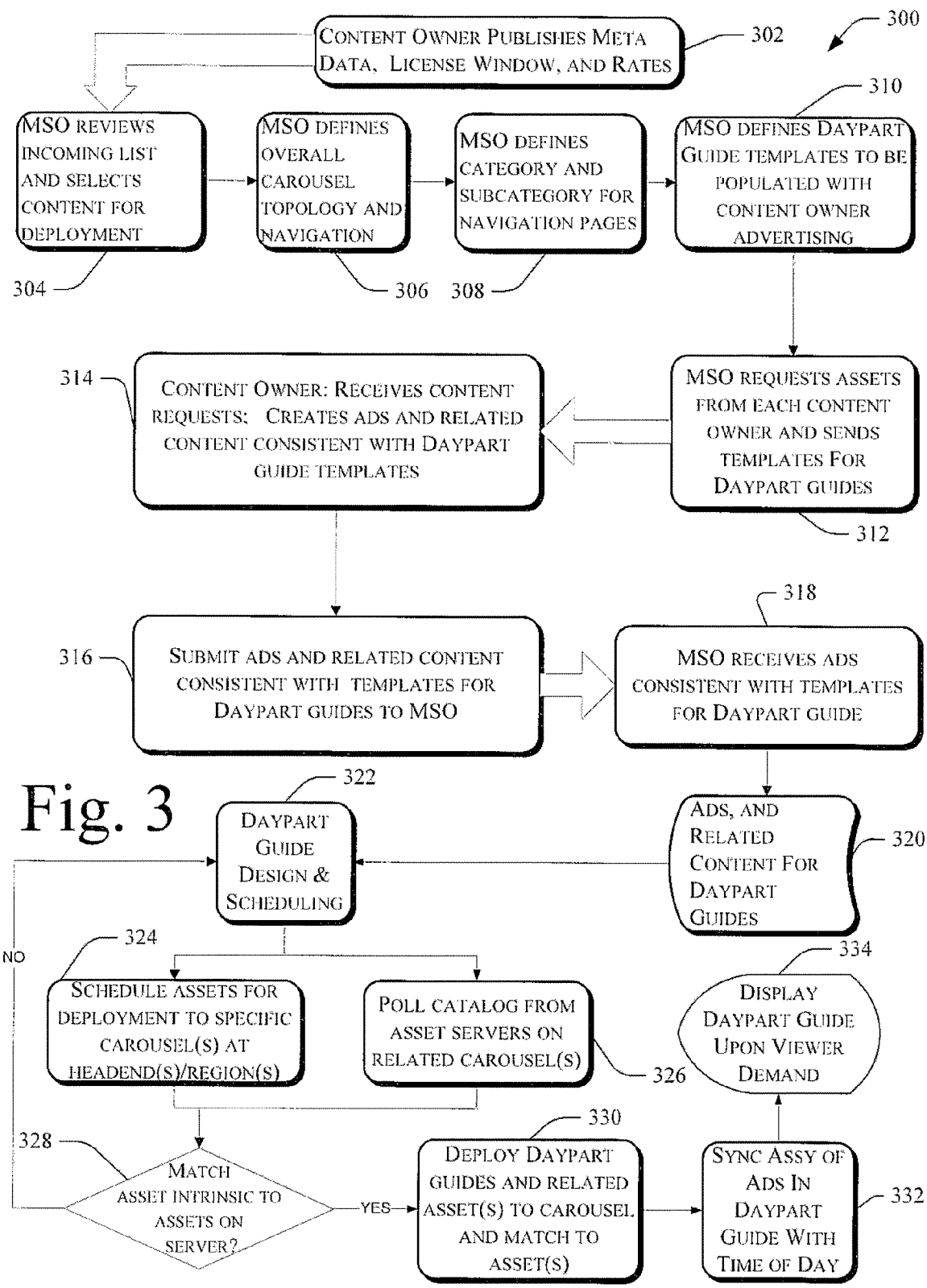
FIG. 3 is a flow chart depicting an implementation of a process by which an MSO selects video assets from a video asset owner, the video asset owner provides advertising (ad) elements for each selected video asset, and by which the MSO assembles the ad elements into a video daypart guide that advertises selected video assets that are to be offered during a daypart in a video delivery service to viewers that will be watching television during that daypart.

FIG. 3 is a flow chart depicting an implementation of a process 300 by which the workflow tool 100 can be implemented in the environment 200. At block 302, a video asset owner or content owner 208(*n*) publishes information, such as a universal asset package, to announce that a video asset is available for distribution to viewers by video delivery service providers. The published information includes but is not limited to metadata, a license or viewing time period window for the video asset, and a suggested retail price for the video asset. These three packets of information make the video delivery service provider aware of the video asset that is being made available to be put into a video delivery service. For instance, when the offer is made by the video asset owner the offer can include an entire movie, a trailer for the movie, and behind the scenes shots during production of the movie. All three are video clips of various lengths that make up the universal asset package for the movie. The published information can also include video assets that serve as advertisements for goods and services.

An arrow between blocks 302 and 304 indicates a transmission from the content owner to the video delivery service provider, which can be MSO 202, but can also be an individual region or headend 206(*p*). Upon receipt of the transmission at block 304, the operator of a MSO 202 reviews the incoming lists of video assets and selects among them for deployment as a video asset that is to be made available to viewers. After block 304, process 300 moves to block 306 where the operator of the MSO 202 defines the overall topography and navigation for each carousel 208(*q*) that is to be scheduled for video delivery services. At block 306, various content in different genres are planned by the operator of the MSO 202 for deployment in video delivery services. For instance, the video assets being planned for deployment may be required to fall into certain genres, such as children's programming, lifestyles or home and living, music, and action movies. Previously, the content owner will likely have classified each offered video asset by genre.

The topography of the carousel 208(*q*) is a hierarchical structure of pages, where the lowest order of the pages may be a starting homepage. The homepage, for instance, may have an area thereon that is reserved for a daypart guide. The topology of the carousel 208(*q*) is similar to a web site having web pages that make up the web site, where a viewer first accesses the web site at its homepage. A viewer that navigates the topography of the carousel 208(*q*) can navigate deeper into the topography so as to access different branches. One such branch might be the action movie genre branch, within which a video on demand movie called "Snatch" might be selected by the viewer that was available as a video asset for delivery to the viewer. Similarly, the viewer may navigate from the homepage to the genre of lifestyles, within which an episode of the television program called "Oprah" might be selected by the viewer that was available as a video asset for delivery to the viewer. This procedure for drilling down, or entering into the topography from the homepage to an individual page or pages, can be used to support the process of viewer selections for making a request for delivery of a video asset—by pay per view (PPV) or by VOD (video-on-demand). The published pages generally represent offerings by the MSO 202 for video delivery services.

At block 308, the network operator for MSO 202 defines categories and subcategories for navigation pages, then process 300 moves to block 310 where the network operator for MSO 202 defines daypart guide templates to be populated with ad elements that are to be furnished by content owners. Depending upon the MSO 204(*n*) of the netop 210(*j*) that provides the video delivery service, the daypart guide templates can be quite varied. For example, if a particular MSO 204(*n*) accommodates only video-phones as a cellular telephone service, a precise format may be required for the daypart guide to be properly delivered. The daypart guide template can be selected based upon the type of end-to-end service provided by the video delivery service provider who is operating a network where viewers buy a service and view a video asset distributed by the video delivery service provider—who in turn has relationships with video asset owners for distributing that content. Thus, the viewer of video assets could be provided with delivery services for video assets through a wireless videophone, a traditional television broadcast channel, a telephone landline, or a monitor in communication with a power line from an electrical power utility that also provides delivery services for video assets.

At block 312, the MSO 202 forms a communication that requests the selected video assets. The communication can also send templates for ad elements. These templates, when completed by designers for advertisers, will provide ad elements suitable for use in a daypart guide. The communication is then transmitted to the corresponding video asset owners.

Block 302 through 312 identify exemplary tasks performed interactively by the network operator for MSO 202 to plan what video assets are to be made available for the video delivery service. The network operator for MSO 202 can search a database of video assets made available by video asset owners. The database is essentially uploaded or updated by each video asset owner. This upload can include the title of the video asset, a mechanically reproducible copy of the video asset, the genre or rating of the video asset, the price of the video asset, and the window that expresses the license period in which the video asset can be offered to video delivery service consumers (e.g., viewers). The network operator for MSO 202 searches available video assets to then select which ones that they want to use or they want to license or acquire. A request is then made to the video asset owner who then will service the request by delivering the pages that support the requested video asset once it has been deployed to a headend or region of headends.

The ad element templates designed by the network operator for MSO 202 define how advertisement information can be provided to MSO 202. Because carousels at headends have limitations, both technically and visually, the ad element templates are designated by the network operator so as to prevent the video asset owner from advertising with a daypart guide, or ad element therein, that will not function properly with a carousel. As such, use of the templates for ad elements by video asset owners ensure that the MSO 202 will be able to accommodate the video asset owner's design of an ad element.

In addition to advertising for content owners, an ad element template for a daypart guide can also be defined so as to prominently display the brand of the MSO 202. One such ad element template, for example, may be designated for a time of day during which children's VOD movies are likely to be purchased, such as for the daytime daypart. The MSO 202 might also have a special brand for their kids programming on weekends to be used for the weekend daypart (e.g., during Saturday morning hours). As such, that brand would be in the Saturday morning daypart guide and would be displayed during the hours of Saturday morning, thus associating the children's TV brand of the MSO 202 with the children's programming genre.

At block 314, the video asset owner 204(*n*) receives content requests and the templates for ad elements that were specified by the MSO 202. The video asset owner 204(*n*) who has received the content request creates ad elements and related content so as to be consistent with the templates for the ad elements. The video asset owner 204(*n*) will create ad element designs that will attract viewers, thereby increasing the buy rate of their video assets by video delivery service consumers (e.g., viewers). Process 300 moves to block 316 at which the ad elements that were designed in accordance with the specified templates are submitted in a transmission to the MSO 202.

At block 318, MSO 202 receives the ad elements in transmissions from each video asset owner for review, approval, and storage at block 320. Block 320 also represents the storage of video assets received from MSO 202 that are related to the stored ad elements. By the time that process 300 has arrived at block 320, the workflow tool 100 indicates to the operator of MSO 202 that MSO 202 has received the ad elements that have been submitted by the video asset owners and that these ad elements are in a queue pending approval. The queue gives the operator of MSO 202 an opportunity to look at the ad elements and corresponding video assets that are being submitted so as to verify that the video asset owners have used the correct templates. For instance, some discretion may be allowed to the operator of MSO 202 as to approval of the proposed ad elements and corresponding video assets.

Storage 320 is a clearing house file of the approved ad elements that are stored and ready to be used by the operator of MSO 202 in designing a daypart guide. At block 322, the operator of MSO 202 schedules video assets for distribution to various headends through processing steps beginning at block 324. With this scheduling, the operator of MSO 202 can also design daypart guides for one or more dayparts (or portions thereof). These daypart guides are then ready for publishing to an actual carousel for use during corresponding dayparts of one or more days during a viewing period that is being scheduled.

At block 322, a split for dual processing occurs by block 324 for scheduling of assets for deployment to specific carousels 208(*q*) at headends/regions 206(*p*), and by block 326 where a poll is taken of catalogs from video delivery servers and related carousels from data layer 106 as seen in FIG. 1. In essence, various daypart guides have been approved that are not to be scheduled for deployment until the corresponding video asset is resident and available on the video delivery server from data layer 106. This prevents a viewer from communicating a request for a video asset that could not be accommodated, such as where a daypart guide shows an ad for a video asset that is not actually resident on the video delivery server from data layer 106. The workflow tool 100 at block 326 polls what is called the video on demand catalog. The catalogue is a published application program interface (API) that lists all of the titles of video assets that have been successfully loaded on the video delivery server from data layer 106. When the polling of the catalogue at block 326 determines that there is an asset on the video delivery server whose metadata corresponds to a page that is sitting in the clearing house of files at block 320, the video asset in the clearing house 320 is flagged to announce that the video asset is then ready for scheduling. The polling and checking process at blocks 326 ensures that a daypart guide is scheduled on the carousel at block 324 when the video assets corresponding to its ad elements are available to the carousel.

A query is performed at block 328 where an attempt is made to match a video asset intrinsic to a video asset on the video delivery server from data layer 106. The function performed at block 328 corresponds to an on-screen graphic button on the daypart guide. If the button is selected by a viewer using an input device, such as a remote control, workflow tool 100 would send a command that would active the video delivery service for a video asset being requested by the viewer by the selection of the corresponding ad element on the daypart guide. The intrinsic represents an argument to automatically confirm the presence of the viewer-requested video asset from the catalogue to the video delivery server so that the video asset can be properly deployed at block 330 in an automated fashion. If the check at block 328 has not been satisfied, process 300 returns to the scheduling block 322 for a repetition of the foregoing.

At block 330, after the check at block 328 has been satisfied, a deployment of the daypart guide and the related video asset(s) are made to the designated carousel and a match is made to the video asset. The procedure undertaken to the point of block 330 can be summarized by way of the following example. A navigation page has a list of titles of movies that are in a particular category, of one of which is titled "MOVIE A". That navigation page is automatically and dynamically created by the workflow tool 100 based on all of the video assets that have been created or have been assigned for this specific category. For that navigation page, if the "MOVIE A" title does not appear in the process of polling the catalogue, then "MOVIE A" will not be shown in the navigation page because there is a way to navigate to the actual page which in turn doesn't have the "MOVIE A" video asset associated with it. So the effect of this double checking is that the workflow tool 100 makes sure that the overall end to end system of supplying a requested video asset is going to work as represented to the viewers.

When a viewer demands, by way of input (e.g., powering on a set top box, or a remote control device operated by a viewer to make an input), to see a daypart guide having thereon an ad element advertising a video asset, the demand is received at block 330 and the daypart guide can be assembled at block 332. This assembly procedure can include the retrieval of ad elements that are to be used in the particular daypart guide that has been scheduled for a particular day and for a particular daypart, or portion thereof, during that day. A chronological synchronization of ad elements, according the schedule and time of day for one or more headends, is initiated for a specified daypart guide. Once the daypart guide has been so assembled, it is displayed for the viewer at block 334.

Figure 4:
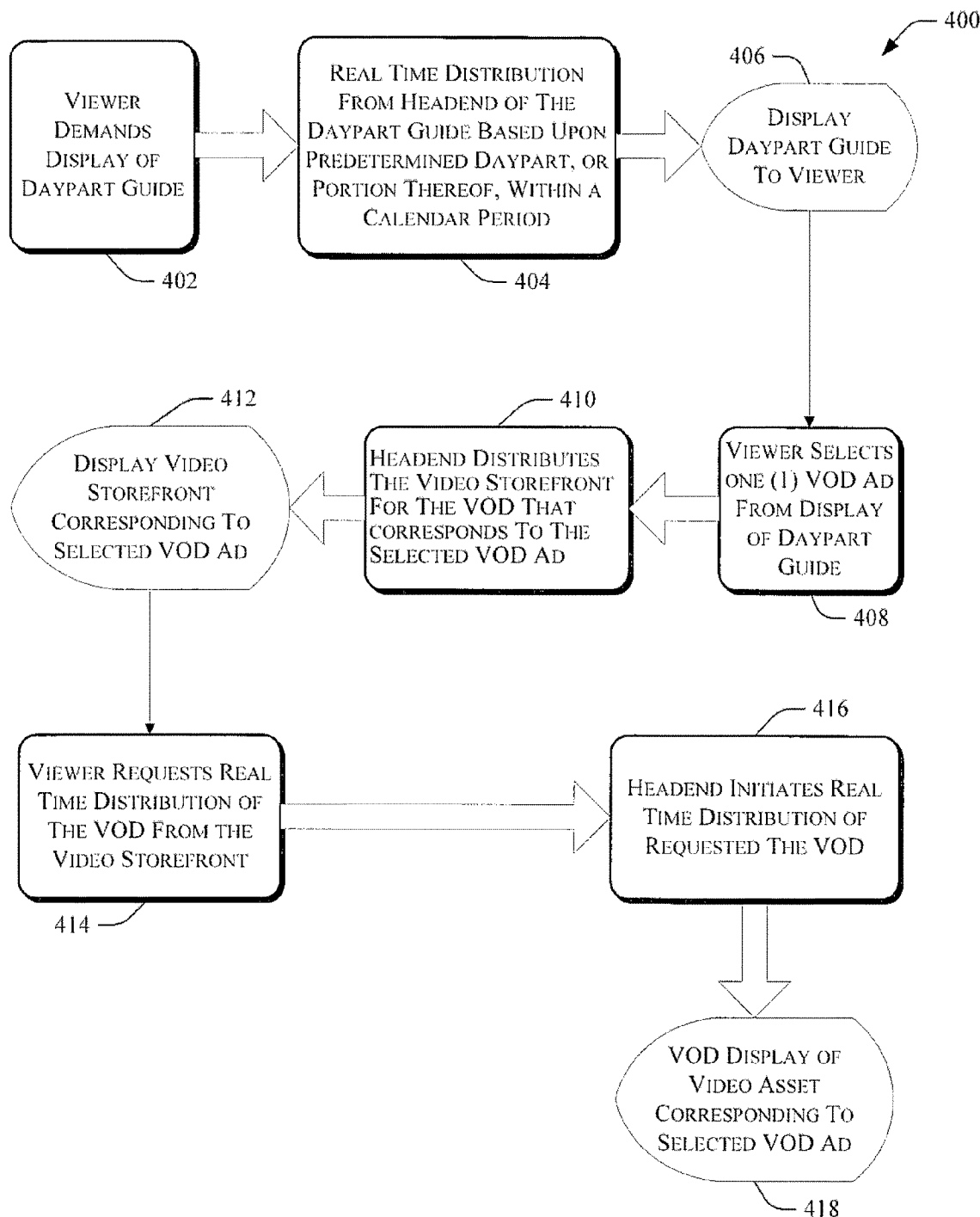
FIG. 4 is a flow chart depicting an implementation of a process by which a viewer views a daypart guide during a particular daypart, selects a video on demand (VOD) ad displayed on the daypart guide, views a video storefront for the selected VOD ad, requests the corresponding VOD from the video storefront, and receives a real time distribution of the VOD.

FIG. 4 is a flow chart depicting an implementation of a process 400 by which a viewer can request a VOD from a daypart guide. At block 402, a viewer demands a display of a daypart guide. At block 404, a real time distribution is made of the daypart guide from a headend associated with the viewer. The daypart guide that is distributed to the viewer is dependent upon a predetermined daypart, or portion thereof, within a calendar period. For instance, a VOD asset may have been made available for distribution only during the specified calendar period, and the VOD asset would be most likely to be of interest to those viewers that are watching TV during a particular time of day that is associated with the predetermined daypart.

At block 406, the viewer sees a display of the daypart guide that was distributed by the headend with which the viewer is associated. At block 408, the viewer selects one (1) VOD ad on the daypart guide by making input with an input device. At block 410, the headend distributes the video storefront for the VOD asset that corresponds to the viewer-selected VOD ad.

At block 412, the viewer sees a display of the video storefront that corresponds to selected VOD ad. At block 414, the viewer provides input that requests a real time distribution of the VOD asset from the video storefront. At block 416, the headend initiates a real time distribution of requested the VOD asset to the viewer so as to be received, for example, by a tuner of the viewer's set top box. At block 418, the viewer receives a real time distribution of the requested VOD asset.

Figure 5:
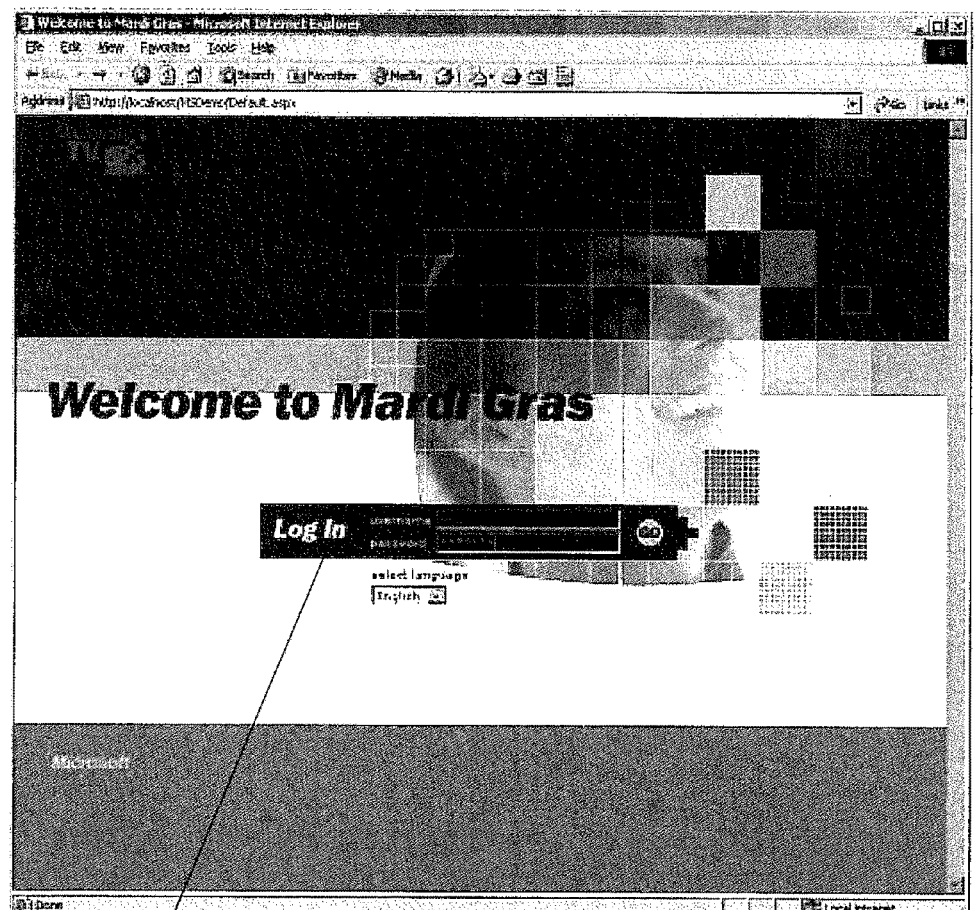
FIG. 5 is a screen shot of an exemplary log screen in a browser application through which access is obtained by both an MSO and video asset owners to a system for delivering video assets, ad elements in daypart guides, and video storefronts to viewers.

FIGS. 5 through 9b provide exemplary screen shots of a user interface to the workflow tool 100 as explained below. FIG. 5 is a screen shot 500 of an exemplary log on screen that can be used by an operator for an MSO or for a video asset owner to access the workflow tool 100. The log on screen is accessible by using a browser application through which access is obtained by both an MSO and video asset owners to a system for providing video assets and corresponding video storefronts to viewers. Both user name and password can be entered via entry fields 502.

Figure 6:
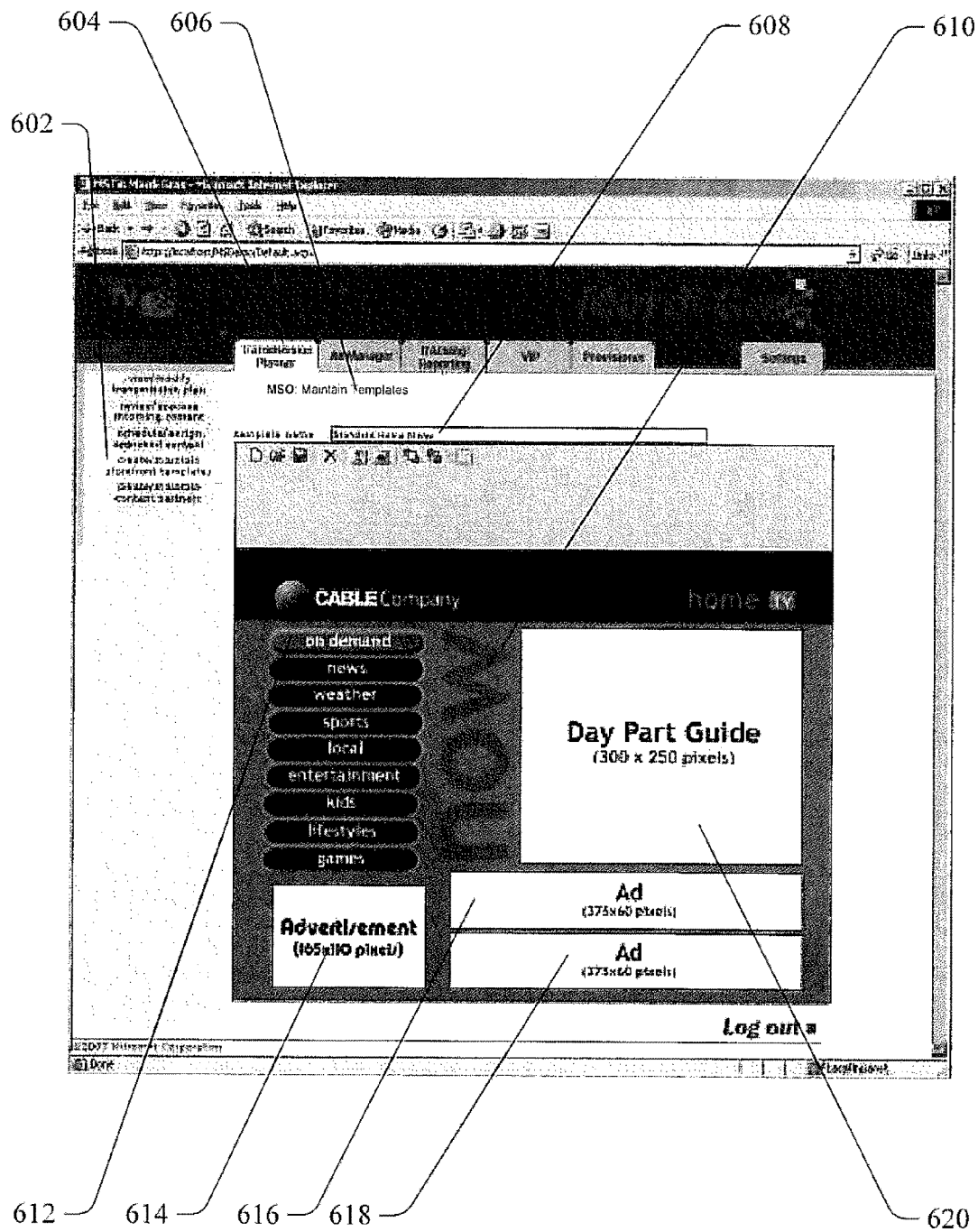
FIG. 6 is a screen shot in a browser application of an exemplary user interface for creating and maintaining a daypart guide template into which an MSO will arrange advertisement elements received from video asset owners in response to a request for one or more video assets, and where other information can also be added into the design that is formed from the daypart guide template.

FIG. 6 shows a daypart guide 620 as part of a homepage template 600. Daypart guide 620 can be created and maintained for the purposes of providing advertising space into which ad elements from advertisers will be inserted for viewing by viewers during particular dayparts or portions thereof. Homepage template 600 is designed so as to be technologically compatible with a relevant headend of the MSO 202 that will be distributing a final version of a homepage to viewers. FIG. 6 is a screen shot depicting a tab 602 on the screen 600, on the left hand side, for "create/maintain templates". This tab 602 initiates functions through which templates can be created and maintained, including a button command template such as the "On Demand" template 612, advertisements templates 614-618 which need not be part of a daypart guide, and the daypart guide template 620. The "On Demand" template 612 is an on-screen button that, when activated by a viewer, will initiate a display of available video assets for a video-on-demand service. Daypart guide template 620 is given a particular visual cue in screen shot 600 by the graphic "NOW" at reference numeral 610. Diagnostic 606 of screen shot 600 indicates the current function to be "Maintain Templates".

Regions 614, 616 and 618 represent discrete templates on screen shot 600 that are available to place advertisements by the MSO 202 (the MSO exclusively controls the placement of the ads). Advertisements templates 614-618 are specified by the MSO 202 for use by advertisers, such as video asset owners 204(n), that have content that they would like a viewer to view. The content may be a video on demand program, a pay per view movie, a video advertisement, or a static page that features graphics, text, and/or other content. Each created template may be saved in unique categories as appropriate for different categories of video assets (e.g., children's programming, home and garden, action movies, documentaries, etc.). Advertisement templates 614-618 can be sent from the MSO 202 to advertisers, such as video asset owner 204(n), for further design consistent with the ad space in homepage template 600 so as to serve as an advertisement for a particular video asset.

Advertisements that can be placed into the regions 614, 616 and 618 are not limited to static advertising. Both moving video and/or sound could be seen and/or heard by viewers of the regions 614, 616 and 618. For instance, more than one tuner can be incorporated into a set top box, or other client device, where each of the tuners could be used to tune to different audio, video, or audio-visual media streams that includes both static ads as well as moving video and/or sound. Each of the media streams received by one of the tuners could then be output, respectively, to the regions 614, 616 and 618. Then, when a viewer highlights or otherwise selects one of the regions 614, 616 and 618, the audio portion of the stream would be heard by the viewer for the selected region. As an alternative to multiple tuners, a different video delivery platform could be used to obtain different media streams that includes both static ads as well as moving video and/or sound, such as Internet Protocol Television.

Tab 604 of screen shot 600 indicates a tab for a transmission planner used by MSO 202 to plan video content that is to be transmitted to viewers from various systems or headends operated by MSO 202. Tab 608 indicates that the template in screen shot 600 is a standard home menu or a homepage storefront. Region 620 represents the area to be taken up by the daypart guide on screen shot 600, where the corresponding daypart guide template contains ad elements, examples of which are discussed below in conjunction with a discussion of FIGS. 7-9a.

Figure 7:
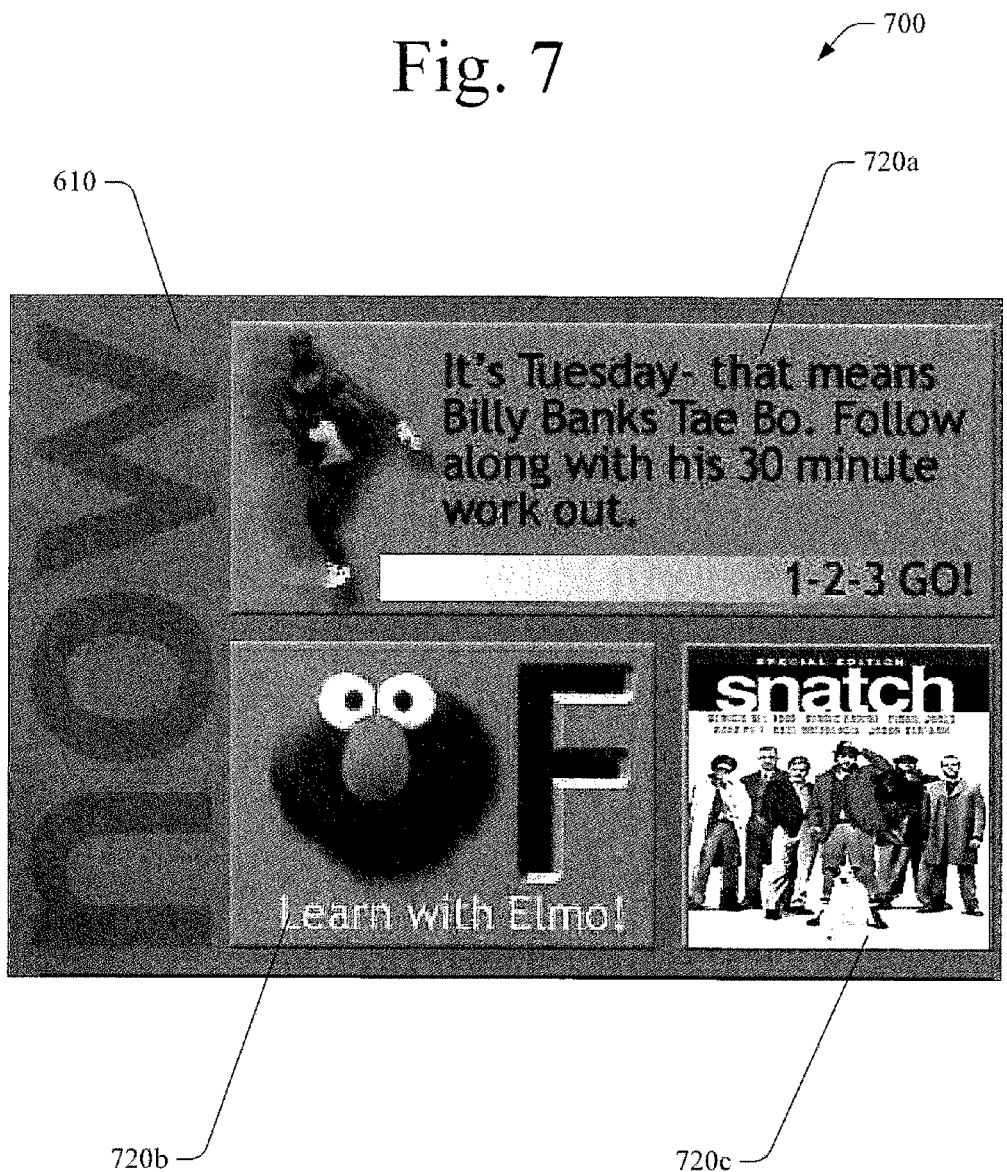
FIG. 7 is a partial screen shot in a browser application of an exemplary daypart guide showing how a daypart guide might appear to a viewer, where the area defined as "NOW" shows three separate pieces of content that target the viewer during a particular daypart, where the defined NOW area of the daypart guide can be navigated via a remote control operated by the viewer, and where the remote control selection of a particular ad element by the viewer will initiate a navigation from the daypart guide to an MPEG page for the selected ad element.

FIG. 7 shows a completed daypart guide 700 having therein the ad elements 720a, 720b, and 720c each of which can be supplied by respective video asset owners 204(n) for the advertisement of corresponding video assets. Each ad element 720a, 720b, and 720c advertises a video asset that is likely to be purchased during the daypart for which the daypart guide is intended to be distributed to viewers. A discussion below with respect to FIG. 10 will present a tool that can be used by a user to assemble ad elements into a daypart guide.

Figure 8:
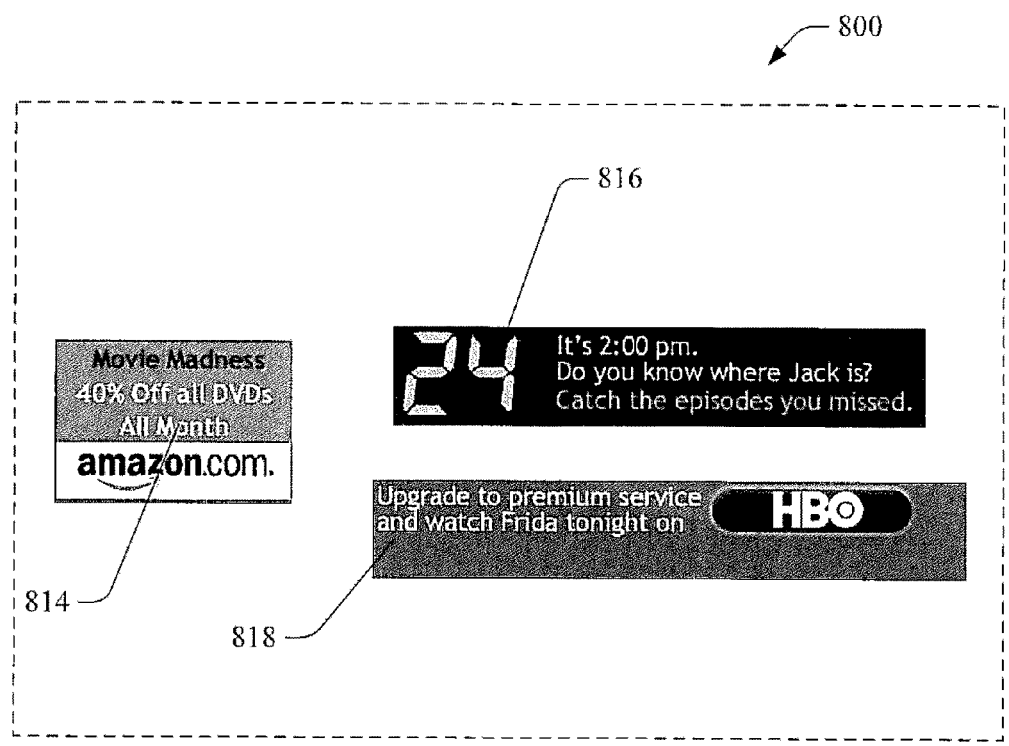
FIG. 8 is a partial screen shot in a browser application of exemplary product and service ad elements that can be inserted by a designer into the daypart guide template seen in FIG. 6, where the ad element defined in the daypart guide can be navigated via a remote control operated by the viewer, and where the remote control selection of a particular ad element by the viewer will initiate a navigation from the daypart guide to an MPEG page for the selected ad element.
Figure 10:
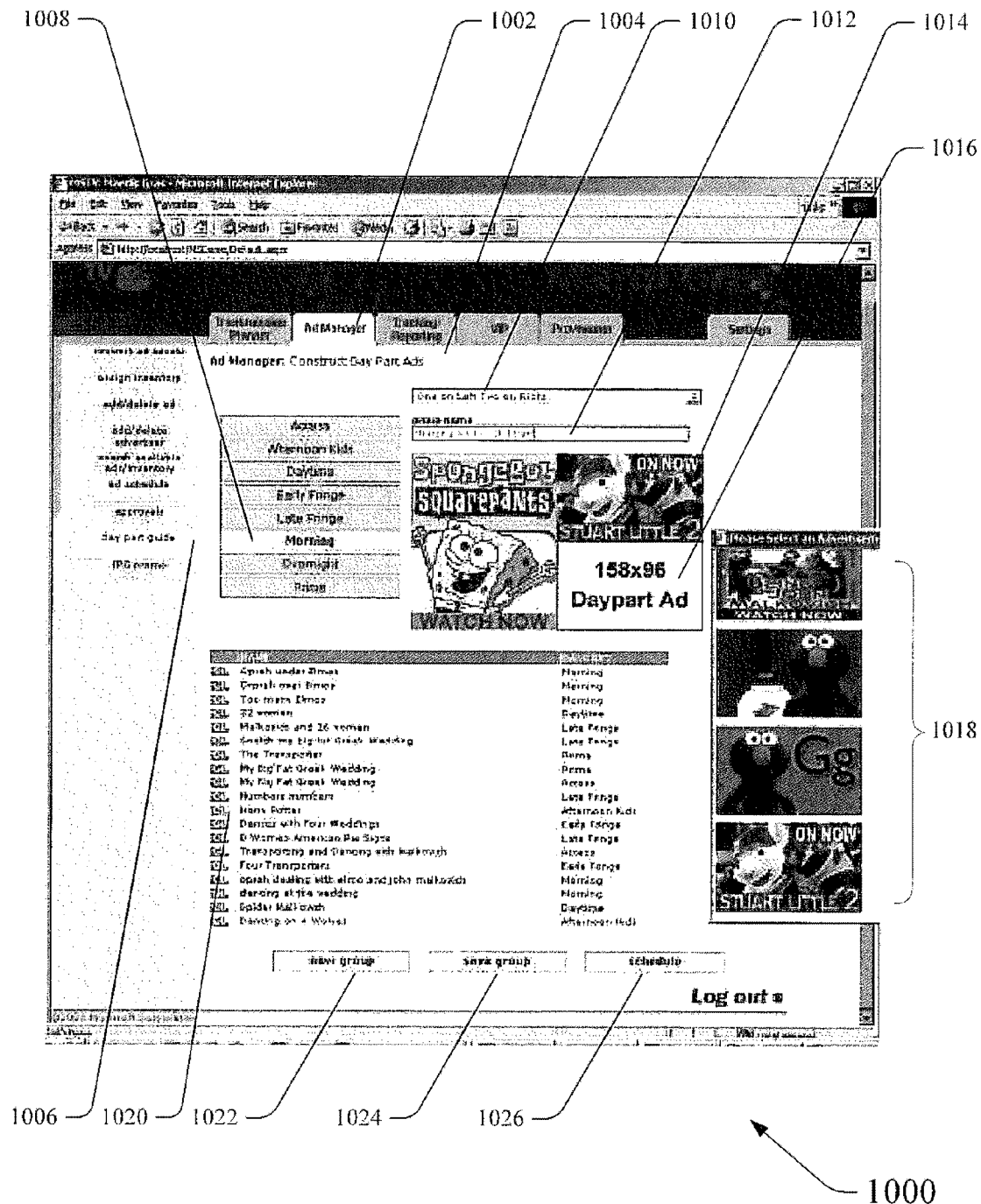
FIG. 10 is a screen shot in a browser application of an advertising management planning tool for constructing a daypart guide by selection from among different ad elements, where the selected ad elements are placed into a structured group to which a name is assigned, where the assigned group name represents the constructed daypart guide that is to scheduled to be shown to viewers at certain hours of different dayparts during a future time period.

FIG. 8 shows a group 800 of ad elements 814, 816, and 818. These ad elements respectively correspond to ad element templates for regions 614, 616 and 618 of screen shot 600. A further discussion is presented below with respect to the tool that can be used by a user to assemble ad elements into a daypart guide, where an exemplary embodiment of the tool is shown in FIG. 10.

Figure 9A:
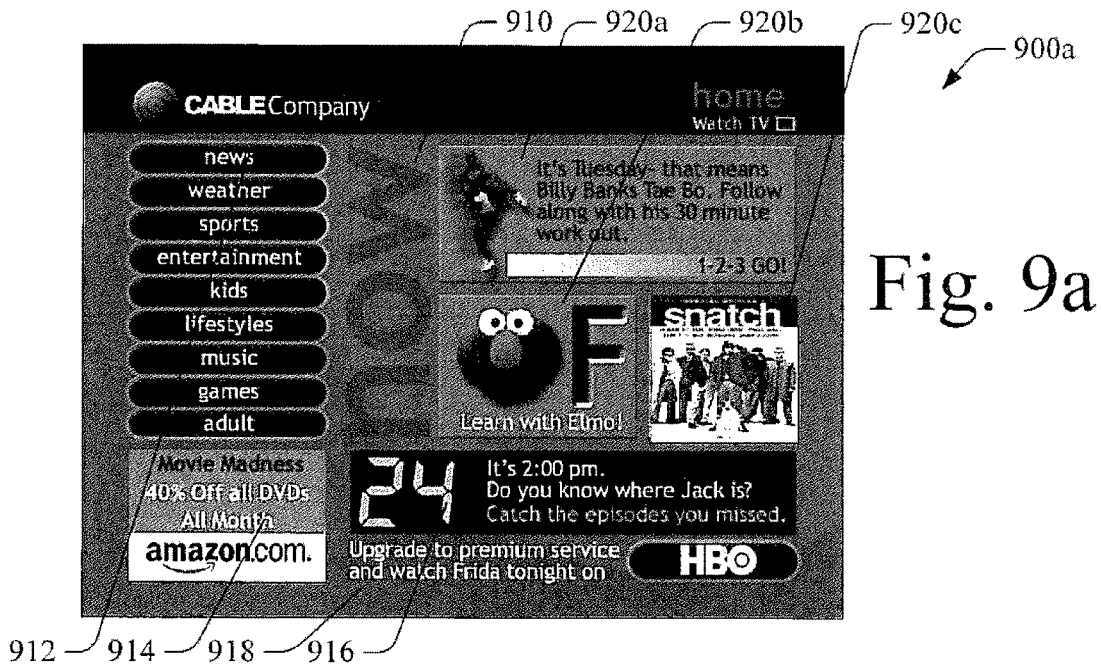
FIGS. 9a-9b are screen shots in a browser application of respective pages that represent, respectively, a completed daypart guide template as seen in FIG. 6 that has a video on demand (VOD) ad element to advertise a video asset that is available for distribution to viewers, and a video storefront that is navigated to when a viewer selects the VOD ad element.
Figure 9B:
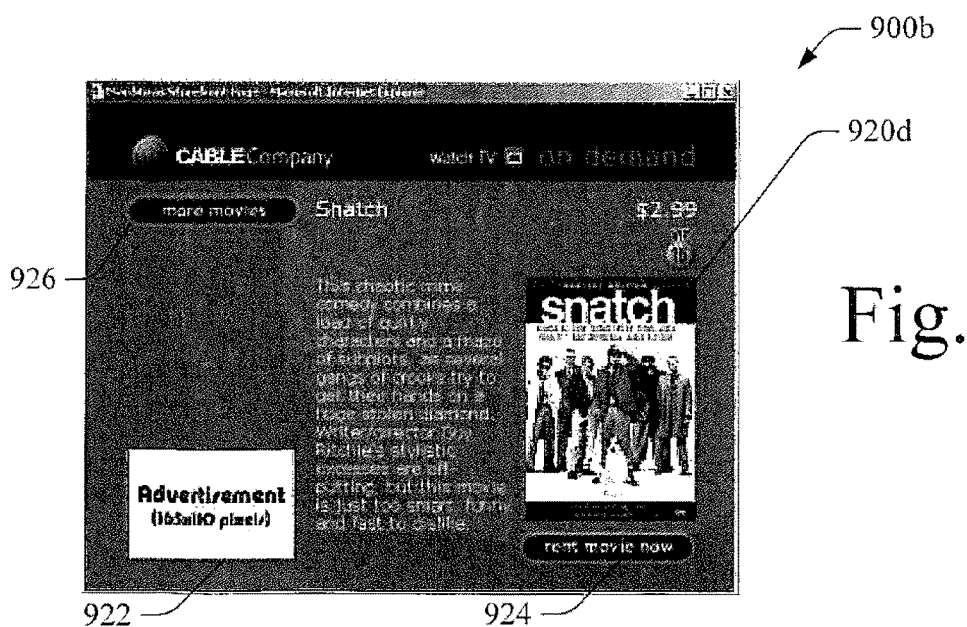

FIGS. 9a-9b are screen shots in a browser application of pages seen by a viewer of a video delivery service. Each design of the screen shots was built from a template. FIG. 9a shows a homepage with a daypart guide and FIG. 9b shows a storefront that advertises a video asset to viewers who, upon payment for same, will receive delivery of the video asset for viewing. On-screen button 912 is a highlighted "news" button that, when activated by a viewer, will initial a display of available news programming. Regions 914, 916 and 918 on screen shot 900a, and region 922 on screen shot 900b, are advertisements from the video asset owners 204(n), respectively, for "amazon.com", "HBO", the "24" TV program, and another third party such a brand ad from the MSO 202. Advertisements 914-918, corresponding to ad elements 914-918, are seen on homepage 900a and represent content that may be a video on demand program, a pay per view movie, a video advertisement, or a static page that features graphics, text, and/or other content. For instance, ad element 914 can be associated with a link to another page from which access to a web site for the Amazon company can be had. Ad element 916 can be a link to a storefront from which a viewer can request a VOD for an episode of a program called "24". Ad element 916 can be a link to navigate to a page of information for the "HBO" company that enables the viewer to upgrade an existing video delivery service by placing an online order for the "HBO" video services. Any such link to ad elements 914-918 can also initiate a video delivery (e.g., a streaming video) that is an advertisement related to the corresponding ad element.

Regions 920a-c in screen shot 900a represent a daypart guide and correspond to ad elements for programming. This programming, as discussed below with respect to Table A, has been selected particularly for viewers being serviced by the Abbeville, La. headend that are likely to order the programming as a PPV or VOD of the viewing period from Feb. 22, 2010 to Feb. 25, 2010, during the daypart portion extending from 11:30 AM (EST) to 12:30 PM (EST). Region 920*a* is associated with a link to a page, called a storefront, where the program titled "Billy Banks Tae Bo" can be ordered by VOD or PPV. Similarly, region 920*b* is associated with a link to a page where the program titled "Learn With Elmo F" can be ordered by VOD or PPV. Also, region 920*c* is associated with a link to a page where the program titled "Snatch" can be ordered by VOD or PPV. The links, by way of example, can be maintained in a table, such as Table A:

TABLE A

| Viewing Period: | Feb. 22, 2010-Feb. 25, 2010 | | | | |
|---|---|---|---|---|---|
| Daypart Portion: | 11:30 AM (EST)-12:30 PM (EST) | | | | |
| Headend: | Abbeville, LA | | | | |
| Reference Numeral | Ad Descpt. | Pixel Size | Viewing Time | Ad Type | Link-To-Page |
| 914 | Amazon | 165 × 110 | 1130-1430 | Brand | LINK1011 |
| 916 | 24 | 375 × 60 | 1000-1430 | VOD | LINK1012 |
| 918 | HBO-Frida | 375 × 60 | 1130-1500 | Service | LINK1013 |
| 920a | Billy Banks Tie Bo | 300 × 120 | 0700-1700 | VOD | LINK1014 |
| 920b | Sesame St Elmo F | 150 × 120 | 1130-1430 | VOD | LINK1015 |
| 920c | Snatch | 150 × 120 | 0930-1230 | VOD | LINK1016 |

Screen shot 900*b* in FIG. 9*b* shows region 920*d* that corresponds to region 920*c* in FIG. 9*a*. Screen shoot 900*b* is a storefront for the video on demand movie "Snatch". When a viewer uses an input device, such as a remote control, to activate region 920*c* in FIG. 9*a*, the workflow tool 100 will link to the page seen FIG. 9*b* in a navigation from the daypart guide to the page of screen shot 900*b*, which can be an MPEG page linked to the region 920*c* for the selected ad element. The viewer can then decide, based upon the content and appearance of the "Snatch" storefront region 900*b*, whether to activate a "rent movie now" button 924 on screen shot 900*b* so as to pay for and begin watching the "Snatch" video asset. Thus, button 924 of screen shot 900*b*, when activated, initiates the 'purchase' or 'buy' of the "snatch" movie that is one of the featured video asset 920*c* of the daypart guide set off by the "NOW" emblem 910. The initiated purchase or buy in turn initiates a real time distribution of the "snatch" movie to the viewer from a headend. Alternatively, on screen shot 900*b*, the viewer can activate a "more movies" button 926 in FIG. 9*b* such that the workflow tool 100 will link to a page (not shown) that will show the viewer additional pay-per-view and/or video on demand video assets that can be ordered for the viewer's viewing. When the viewer uses an input device to activate any of the on screen buttons 924, 926 in FIG. 9*b*, the workflow tool 100 will provide the navigation for the viewer's browser application.

Table A shows, for reference numerals 914-918, that ads can also be used as part of a planned advertising for a daypart or portion thereof. As such, a homepage can be used as a complete daypart guide in itself to publish advertising that can be targeted to specific audiences that are most likely to be watching television during a daypart of a viewing period and that are also mostly likely to purchase the advertised goods or services.

FIG. 10 is a screen shot 1000 in a browser application of an advertising management planning tool for constructing a daypart guide. A tab 1002 allows a user to select the advertising management tool. A function 1004 called 'Construct Daypart Ads' can be selected from a pull down menu. A daypart guide function 1006 is seen in screen shot 1000 as the category of work being performed by the user.

The operation being performed by the user in screen shot 1000 includes constructing a daypart guide for the morning daypart as seen by the highlighted "morning" area at reference numeral 1008. The user is constructing a group of ad elements into a 'One on Left Two on Right' arrangement as seen by the selection 1010 from a pull down menu. Other arrangements of ad elements can be selected from the selection 1010 by using the pull down menu, such as 'two ads side-by-side', 'one ad', 'Four ads 2-by-2', etc.

The user has input a group name 1012 of 'Morning Ad for Children' which is to represent the arrangement of ad elements seen at reference numeral 1014. An empty area 1016, having 158×96 dimensions, is to be filled by a selection of an ad element matching those dimensions. The ad elements that have been found to match the 158×96 dimensions are shown as selections 1018 on screen shot 1000. The user can select one ad element from among four (4) different ad elements as shown in FIG. 10.

A list 1020 of group names is seen in FIG. 10, where each group name represents a collection of ad elements that have been arranged into a daypart guide. A user can create new group of ad elements for a daypart guide by clicking on the "New Group" button 1022. A user can save a group of ad elements under a group name for a daypart guide by clicking on the "Save Group" button 1024 when accompanied by an input of the group name at field 1012. Following the arrangement of ad elements into a daypart guide that is given a group name at field 1012 and designed for use during a particular daypart, the user can schedule the group name to be used as a daypart guide by clicking on the "Schedule" button 1026. A transition will then take place from screen shot 1000 in FIG. 10 to screen shot 1100 in FIG. 11.

Figure 11:
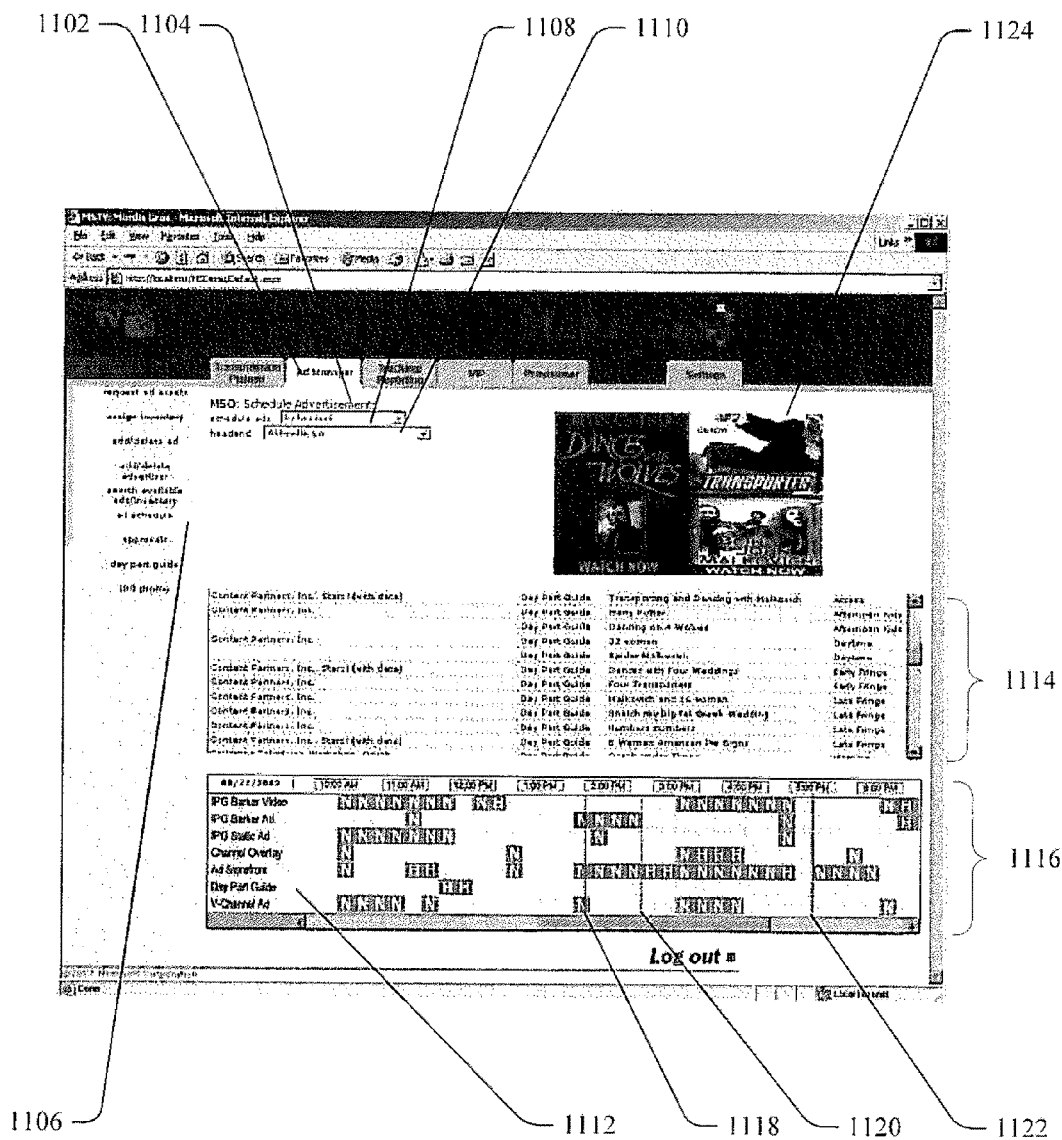
FIG. 11 is a screen shot in a browser application of an advertising management planning tool for scheduling daypart guides by group name, where the daypart guides are to be shown to viewers at certain hours of different dayparts during a future time period from a particular headend.

Screen shot 1100 in FIG. 11 is shown in the same browser application as screen shot 1000 was shown, where an advertising management planning tool for scheduling advertisements is indicated, respectively, at a tab 1102, a function category 1104, and a specific function 1106. An ad scheduling function 1108 allows a user to 'Schedule ads by headend' via a selection from a pull down menu. The ad scheduling function 1108 allows the user to select other choices, such as 'Schedule ads by network', 'Schedule ads by region', etc. A headend selection field 1110 is operated as a pull down menu and shows the headend 'Abbeville, La.' as being the headend that was selected by the user.

A daypart guide 1124 is selected by a user from the list of group names seen at reference numeral 1114, where the selected daypart guide 1124 has the group name 'Transporting and Dancing with Malkovich' seen at the top of the list. To schedule a daypart guide for viewing by viewers, the user clicks on a group name. When the user clicks on the group name, the arrangement of ad elements of the daypart guide in the corresponding group appears on screen shot 1100, such as is seen at reference numeral 1124. After clicking on the group name, the user drags the group name to an available time slot in a Daypart Guide Row 1112 in a timeline schedule 1116. For example, the timeline schedule 1116 shows that the Daypart Guide Row 1112 has only one daypart guide that is scheduled, during the time period from 11:00 AM to 11:30 AM, for Aug. 22, 2003. As such, the depicted daypart guide 1124 can be scheduled for all but one-half hour of the time period shown in screen shot 1100.

The ad scheduling aspect of the ad management application may be configured to prevent a user from scheduling a daypart guide into any row other than the Daypart Guide Row 1112 in timeline schedule 1116. Other rows, not relevant to the present discussion, represent other visual content that can be displayed to a viewer under various conditions of interaction with the viewer. In timeline schedule 1116, an icon "H" indicates individual headend scheduling and an "N" icon indicates network-wide scheduling.

The timeline schedule 1116 is shown in screen shot 1100 as being divided by markers 1118, 1120, and 1122. The ad scheduling aspect of the ad management application may be configured to set these markers on the timeline schedule 1116. For instance, a marker of one color and weight could be automatically set at a time that separates the different dayparts, such as at a division between the daytime daypart and the early fringe daypart, as is shown at 5:00 PM. The application can also be configured to set a marker at the current time of day. Alternatively, the user may be enabled to set other markers at their time of their own discretion.

Exemplary Environment

Figure 12:
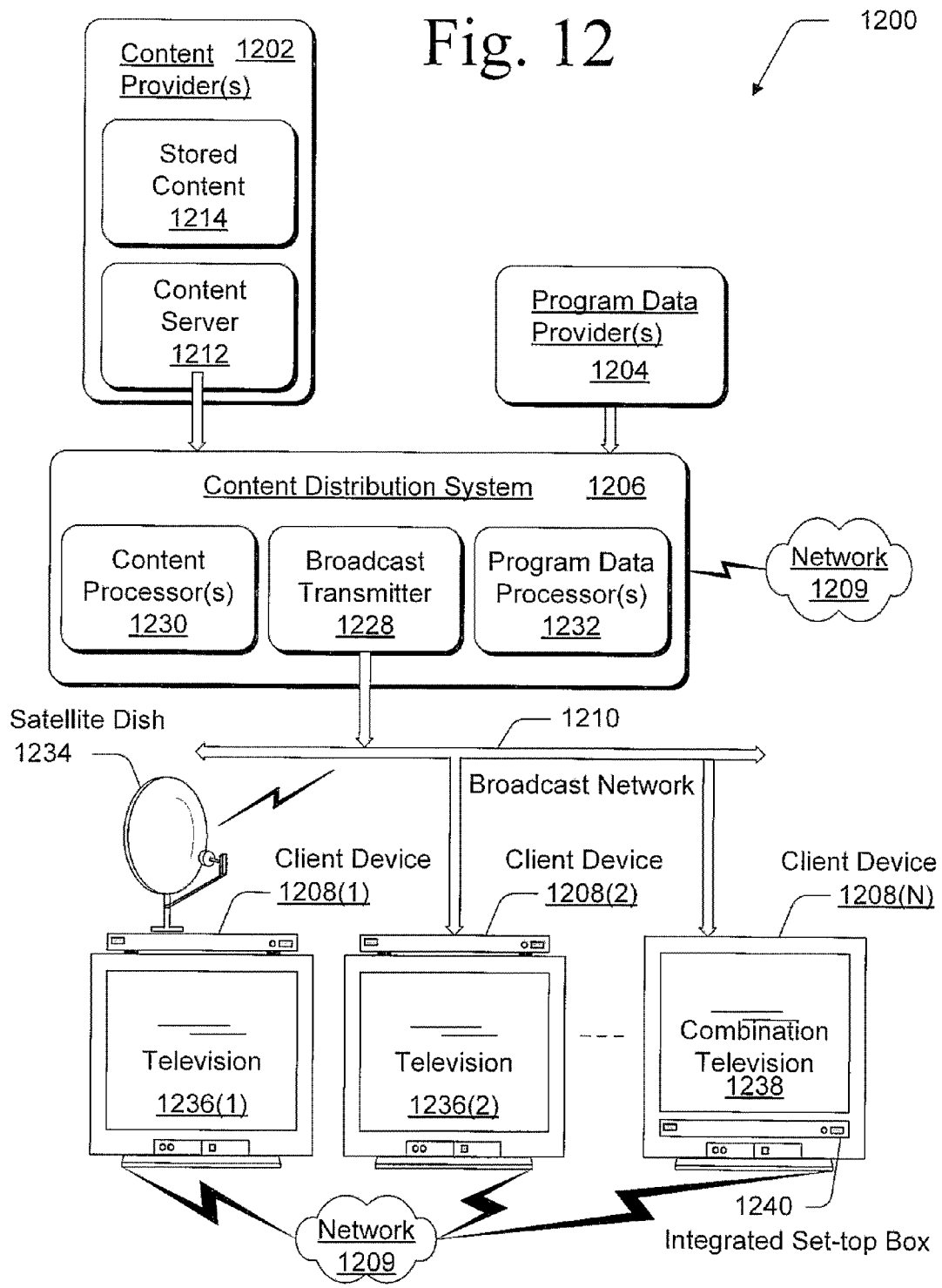
FIG. 12 illustrates an exemplary environment in which a viewer can receive multimedia content via a client device as may be implemented by the systems, apparatus, methods, and computer readable medium described herein.

FIG. 12 illustrates an exemplary environment in which a viewer can receive multimedia content via a client device as may be implemented by the systems, apparatus, methods, and computer readable medium described herein. Exemplary environment 1200 is a television entertainment system that facilitates distribution of content and program data to multiple viewers. The environment 1200 includes one or more content providers 1202, one or more program data providers 1204, a content distribution system 1206, and multiple client devices 1208(1), 1208(2), ..., 1208(N) coupled to the content distribution system 1206 via a broadcast network 1210. By way of analogy, environment 1200 corresponds to environment 200, where content providers 1202 correspond to content owners 204, and where content distribution system 1206 corresponds to MOS 202.

Content provider 1202 includes a content server 1212 and stored content 1214, such as movies, television programs, commercials, music, and similar audio and/or video content. Content server 1212 controls distribution of the stored content 1214 from content provider 1202 to the content distribution system 1206. Additionally, content server 1212 controls distribution of live content (e.g., content that was not previously stored, such as live feeds) and/or content stored at other locations to the content distribution system 1206.

Program data provider 1204 stores and provides an electronic program guide (EPG) database as well as storefronts and daypart guides. Program data in the EPG includes program titles, ratings, characters, descriptions, actor names, station identifiers, channel identifiers, schedule information, and so on. The terms "program data" and "EPG data" are used interchangeably throughout this discussion. For discussion purposes, an electronic file maintains the program data that may include a program title, a program day or days to identify which days of the week the program will be shown, and a start time or times to identify the time that the program will be shown on the particular day or days of the week.

The program data provider 1204 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The program data provider 1204 controls distribution of the published version of the program data to the content distribution system 1206 using, for example, a file transfer protocol (FTP) over a TCP/IP network (e.g., Internet, UNIX, etc.). Further, the published version of the program data can be transmitted from program data provider 1204 via a satellite 1234 directly to a client device 1208 by use of a satellite dish 1234.

Content distribution system 1206 includes a broadcast transmitter 1228, one or more content processors 1230, and one or more program data processors 1232. Broadcast transmitter 1228 broadcasts signals, such as cable television signals, across broadcast network 1210. Broadcast network 1210 can include a cable television network, RF, microwave, satellite, and/or data network, such as the Internet, and may also include wired or wireless media using any broadcast format or broadcast protocol. Additionally, broadcast network 1210 can be any type of network, using any type of network topology and any network communication protocol, and can be represented or otherwise implemented as a combination of two or more networks.

Content processor 1230 processes the content received from content provider 1202 prior to transmitting the content across broadcast network 1210. Similarly, program data processor 1232 processes the program data received from program data provider 1204 prior to transmitting the program data across broadcast network 1210. A particular content processor 1230 may encode, or otherwise process, the received content into a format that is understood by the multiple client devices 1208(1), 1208(2), ..., 1208(N) coupled to broadcast network 1210. Although FIG. 12 shows a single content provider 1202, a single program data provider 1204, and a single content distribution system 1206, exemplary environment 1200 can include any number of content providers and/or program data providers coupled to any number of content distribution systems.

Content distribution system 1206 is representative of a headend service with one or more carousels that provides storefronts, daypart guides, and EPG data, as well as content, to multiple subscribers. Each content distribution system 1206 may receive a slightly different version of the program data that takes into account different programming preferences and lineups. The program data provider 1204 creates different versions of EPG data (e.g., different versions of a program guide) that include those channels of relevance to respective headend services, and the content distribution system 1206 transmits the EPG data to the multiple client devices 1208(1), 1208(2), ..., 1208(N). In one implementation, for example, content distribution system 1206 utilizes a carousel file system to repeatedly broadcast the EPG data, storefronts, and daypart guides over an out-of-band (GOB) channel to the client devices 1208.

Client devices 1208 can be implemented in a number of ways. For example, a client device 1208(1) receives broadcast content from a satellite-based transmitter via satellite dish 1234. Client device 1208(1) is also referred to as a set-top box or a satellite receiving device. Client device 1208(1) is coupled to a television 1236(1) for presenting the content received by the client device (e.g., audio data and video data), as well as a graphical user interface. A particular client device 1208 can be coupled to any number of televisions 1236 and/or similar devices that can be implemented to display or otherwise render content. Similarly, any number of client devices 1208 can be coupled to a single television 1236.

Client device 1208(2) is also coupled to receive broadcast content from broadcast network 1210 and provide the received content to associated television 1236(2). Client device 1208(N) is an example of a combination television 1238 and integrated set-top box 1240. In this example, the various components and functionality of the set-top box are incorporated into the television, rather than using two separate devices. The set-top box incorporated into the television may receive broadcast signals via a satellite dish (similar to satellite dish 1234) and/or via broadcast network 1210. In alternate implementations, client devices 1208 may receive broadcast signals via network 1209, such as the Internet, or any other broadcast medium.

Each client device 1208 runs an electronic program guide (EPG) application that utilizes the program data. An EPG application enables a television viewer to navigate through an onscreen program guide and locate television shows of interest to the viewer. With an EPG application, the television viewer can look at schedules of current and future programming, set reminders for upcoming programs, and/or enter instructions to record one or more television shows.

The EPG application enables the television viewer to look at EPG, daypart guides, and storefronts for the purpose of ordering and viewing linear programming as well as pay per view and/or video on demand programming. As such, one or more of the program data providers 1204 can include stored on-demand content, such as Video On-Demand (VOD) movie content, and near VOD such as pay per view movie content. The stored on-demand and near on-demand content can be viewed with a client device 1208 through an onscreen movie guide, for example, and a viewer can enter instructions to stream a particular movie, or other stored content, down to a corresponding client device 1208.

Each client device 1208 (1 through N) and the content distribution system 1206 are in communication with a network 1209 that provides two-way communications there between. The content distribution system 1206 services EPG data, daypart guides, and storefronts to any requesting client device 1208 (1 through N). To request EPG data, daypart guides, and storefronts on the two-way network 1209, each client device 1208 transmits a request to the content distribution system 1206.

Exemplary Client Device

Figure 13:
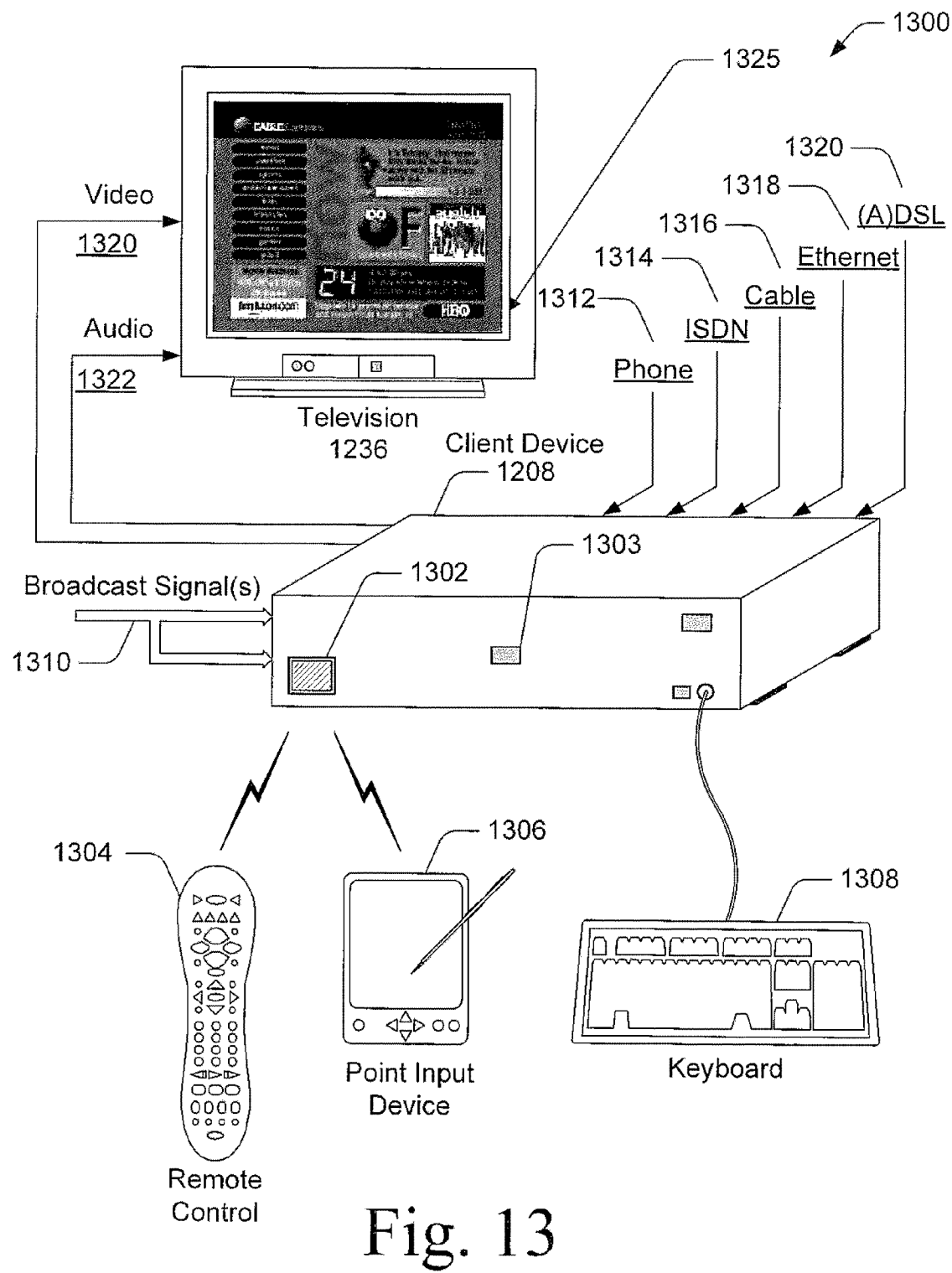
FIG. 13 illustrates of an example client device, a television, and various input devices that interact with the client device.

FIG. 13 illustrates an exemplary implementation 1300 of a client device 1208 shown as a standalone unit that connects to a television 1236. Client device 1208 can be implemented in any number of embodiments, including as a set-top box, a satellite receiver, a TV recorder with a hard disk, a game console, an information appliance, and so forth. Client device 1208 includes a wireless receiving port 1302, such as an infrared (IR) or Bluetooth wireless port, for receiving wireless communications from a remote control device 1304, a handheld input device 1306, or any other wireless device, such as a wireless keyboard. Handheld input device 1306 can be a personal digital assistant (PDA), handheld computer, wireless phone, or the like. Additionally, a wired keyboard 1308 is coupled to communicate with the client device 1208. In alternate embodiments, remote control device 1304, handheld device 1306, and/or keyboard 1308 may use an RF communication link or other mode of transmission to communicate with client device 1208.

Client device 1208 receives one or more broadcast signals 1310 from one or more broadcast sources, such as from a satellite or from a broadcast network. Client device 1208 includes hardware and/or software for receiving and decoding broadcast signal 1310, such as an NTSC, PAL, SECAM or other TV system video signal. Client device 1208 also includes hardware and/or software for providing the viewer with a graphical user interface by which the viewer can, for example, access various network services, configure the client device 1208, and perform other functions.

Client device 1208 is capable of communicating with other devices via one or more connections including a conventional telephone link 1312, an ISDN link 1314, a cable link 1316, an Ethernet link 1318, an ADSL and/or DSL link 1320, and the like. Client device 1208 may use any one or more of the various communication links 1312-1320 at a particular instant to communicate with any number of other devices and/or to establish a two-way communication with the content distribution system 1006 seen in FIG. 10.

Client device 1208 generates video signal(s) 1320 and audio signal(s) 1322, both of which are communicated to television 1236. The video signals and audio signals can be communicated from client device 1208 to television 1236 via an RF (radio frequency) link, S-video link, composite video link, component video link, or other communication link. At reference numeral 1303 in FIG. 13, client device 1208 includes one or more lights or other indicators identifying the current status of the device or for diagnostic reports to a viewer. Additionally, the client device may include one or more control buttons, switches, or other selectable controls for controlling operation of the device.

Figure 14:
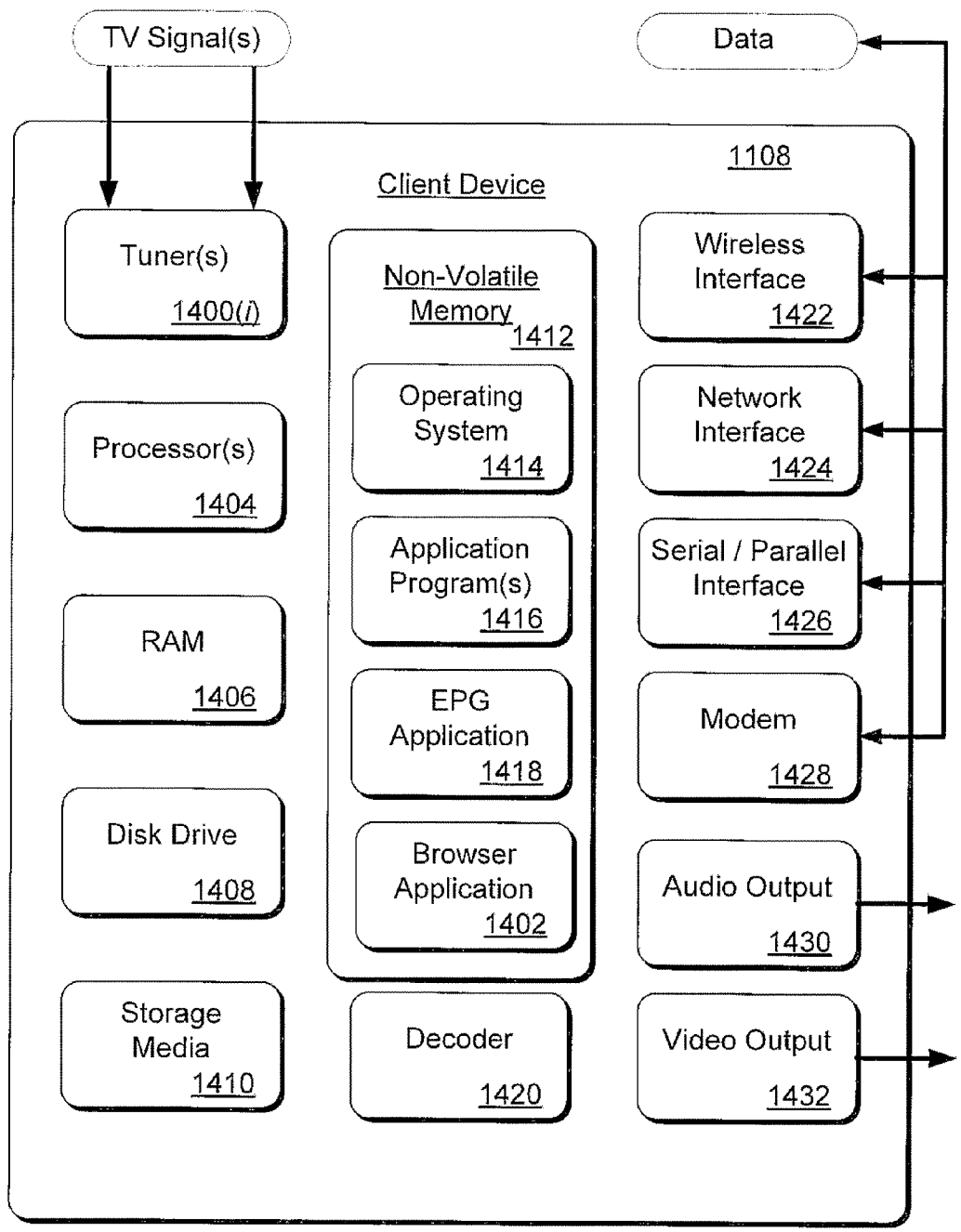
FIG. 14 is a block diagram that illustrates components of the example client device(s) shown in FIGS. 11-12.

FIG. 14 illustrates selected components of client device(s) 1208 shown in FIGS. 12 and 13. Client device 1208 includes one or more tuners 1400(*i*). Tuners 1400(*i*) are representative of one or more in-band tuners that tune to various frequencies or channels to receive television signals, as well as an out-of-band tuner that tunes to the broadcast channel over which the EPG data, including storefronts and daypart guides, is broadcast to client device 1208.

Client device 1208 also includes one or more processors 1404 and one or more memory components. Examples of possible memory components include a random access memory (RAM) 1406, a disk drive 1408, a mass storage component 1410, and a non-volatile memory 1412 (e.g., ROM, Flash, EPROM, EEPROM, etc.). Alternative implementations of client device 1208 can include a range of processing and memory capabilities, and may include more or fewer types of memory components than those illustrated in FIG. 14. For example, full-resource clients can be implemented with substantial memory and processing resources, including a disk drive 1408 to store content for replay by the viewer. Low-resource clients, however, may have limited processing and memory capabilities, such as a limited amount of RAM 1406, no disk drive 1408, and limited processing capabilities. Nevertheless it is intended that client device 1208 include a capability for video recording, either locally or remotely from client device 1208.

Processor(s) 1404 process various instructions to control the operation of client device 1208 and to communicate with other electronic and computing devices. The memory components (e.g., RAM 1406, disk drive 1408, storage media 1410, and non-volatile memory 1412) store various information and/or data such as content, EPG data, daypart guides, storefronts, configuration information for client device 1208, and/or graphical user interface information.

An operating system 1414 and one or more application programs 1416 may be stored in non-volatile memory 1412 and executed on processor 1404 to provide a runtime environment. A runtime environment facilitates extensibility of client device 1208 by allowing various interfaces to be defined that, in turn, allow application programs 1416 to interact with client device 1208. In the illustrated example, an EPG application 1418 is stored in memory 1412 to operate on the EPG data and generate a program guide. The application programs 1416 and the EPG application 1418, when executed, perform the daypart guide functions as disclosed herein, which execution may be implemented at client device 1208. The application programs 1416 can also include an email program to facilitate electronic mail, and so on.

FIG. 14 shows non-volatile memory 1412 having a browser application 1402 which, when executed by processor(s) 1404, can be used to browse the Web, to initiates a request to display a storefront and/or a daypart guide, and also to initiate a demand for the viewing of a pay per view and/or video on demand program from content distribution system 1006 seen in FIG. 10 via a two-way network. The request and demand are executed by one or more processors 1404 of browser application 1402 so as to retrieve the daypart guide, storefront, and programming which can be then be stored in any location within any memory device of client device 1208, such as in non-volatile memory 1412, RAM 1406, disk drive 1408, and/or storage media 1410. The communication on the two-way network to the content distribution system 1006 is made using network interface 1424, wireless interface 1422, serial/parallel interface 1426, modem 1428, or other well known communication hardware/software algorithms and protocol for computing devices. By way of example, such communication can be architected similar to that seen in FIG. 12 where two-way communications network 1209 is coupled with client device 1208 and with content distribution system 1206.

Client device 1208 can also include other components pertaining to a television entertainment system which are not illustrated in this example for simplicity purposes. For instance, client device 1208 can include a user interface application and user interface lights, buttons, controls, etc. to facilitate viewer interaction with the device.

Client device 1208 also includes a decoder 1420 to decode a broadcast video signal, such as an NTSC, PAL, SECAM or other TV system video signal. Alternatively, a decoder for client device 1208 can be implemented, in whole or in part, as a software application executed by processor(s) 1404. Client device 1208 further includes a wireless interface 1422, a network interface 1424, a serial and/or parallel interface 1426, and a modem 1428. Wireless interface 1422 allows client device 1208 to receive input commands and other information from a viewer-operated input device, such as from a remote control device or from another IR, Bluetooth, or similar RF input device.

Network interface 1424 and serial and/or parallel interface 1426 allows client device 1208 to interact and communicate with other electronic and computing devices via various communication links. Although not shown, client device 1208 may also include other types of data communication interfaces to communicate with other devices. Modem 1428 facilitates client device 1208 communications with other electronic and computing devices via a conventional telephone line. Components seen at reference numerals 1416 and 1422-1428 facilitate applications where client device 1208 has Internet access or communicates data on a two-way network.

Client device 1208 also includes an audio output 1430 and a video output 1432 that provide signals to a television or other device that processes and/or presents or otherwise renders the audio and video data. Although shown separately, some of the components of client device 1208 may be implemented in an application specific integrated circuit (ASIC). Additionally, a system bus (not shown) typically connects the various components within client device 1208. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is been made herein to one or more client devices, such as client device 1208. As used herein, "client device" means any electronic device having data communications, data storage capabilities, and/or functions to process signals, such as broadcast signals, received from any of a number of different sources.

Implementations extend to methods, client devices, digital video recorders, computer programs, and systems for recording programming content by requesting and receiving real time data. The implementations may comprise a special purpose or general purpose computer including various computer hardware as discussed by way of example in greater detail above.

Implementations also include computer-readable media for carrying or having computer-executable instructions or data structures stored thereon. Such computer-readable media can be any available media which can be accessed by a general purpose or special purpose computer. One example of a special purpose computer is a set top box. By way of example, and not limitation, such computer-readable media can comprise RAM, ROM, EEPROM, CD-ROM, DVR-R or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The Figures and the foregoing discussion are intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multiprocessor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented on a computing device by a processor configured to execute instructions that, when executed by the processor, direct the computing device to perform acts comprising:
searching a multimedia program database for one or more multimedia programs based on: (1) an indicated viewing period, and (2) a licensing agreement of the multimedia program;
requesting a multimedia program of the one or more multimedia programs and a corresponding ad element based on the searching of the multimedia program database, wherein the requested ad element specifies a desired format of the ad element based on a technology capability of a broadcast carousel of a multisystem operator;
receiving the requested multimedia program and the corresponding ad element for a real time distribution to a third party, wherein the received ad element complies with the desired format;
forming a plurality of daypart guides each comprising:
a template page including advertising space;
the ad element assembled into the template page;
a first navigational link from the ad element to a video storefront for a corresponding multimedia program, the video storefront including a second navigational link selectable by the third party to initiate a real time distribution of the corresponding multimedia program;
indication of a time of day; and
indication of one or more headends;
transmitting each formed daypart guide to the indicated one or more headends before the indicated time of day of any day during the viewing period;
receiving a daypart guide request from the third party;
determining which of the plurality of formed daypart guides corresponds to the daypart guide request by comparing the time of day of the daypart guide request with the indicated time of day;
polling a video delivery server for the corresponding multimedia program; and
when the polling determines that the corresponding multimedia program is resident on the video delivery server, initiating a real time distribution of the determined daypart guide to the third party from the indicated one or more headends that is associated with the third party;
wherein, a content provider indicates the indicated one or more headends, the indicated time of day, and the indicated viewing period, wherein the content provider has ownership rights in the multimedia program and the owner of the indicated one or more headends receives distribution rights in the multimedia program from the content provider.

2. A method as described in claim 1, further comprising transmitting the multimedia program corresponding to the selected ad element to the indicated headend prior to the viewing period, wherein the viewing period is a plurality of days.

3. A method as described in claim 1, further comprising:
receiving a request from the third party for a real time distribution of the multimedia program, wherein the request is initiated by:
a first input selecting the ad element in the determined daypart guide;
a transmission to the third party of the video storefront linked to the selected ad element; and
a second input making the request from the video storefront;
initiating the real time distribution of the requested multimedia program to the third party from the indicated headend.

4. A method as described in claim 1, further comprising:
receiving transmissions from a plurality of content providers each including information regarding a plurality of multimedia programs available for real time distribution to third parties during respective viewing periods; and
receiving input to make requests for, and corresponding to, the multimedia programs.

5. A method as described in claim 1, wherein the transmitting and receiving is performed through the internet.

6. A method as described in claim 1, wherein the multimedia program is selected from the group consisting of a pay per view, a video on demand, and a multimedia advertisement.

7. A method as described in claim 1, wherein the video storefront contains an information regarding the corresponding multimedia program, the information selected from the group consisting of:
a title of the multimedia program;
the viewing period;
a genre;
a name of a corresponding content provider;
a studio corresponding to the multimedia program;
a preview availability for the multimedia program;
a run time for the multimedia program;
a type of the multimedia program;
a value for box office revenue for the multimedia program;
a rating value for the multimedia program; and
a combination of the foregoing.

8. A method as described in claim 1, wherein the multimedia program further comprises a preview of the multimedia program.

9. A method as described in claim 1, wherein:
the video storefront is a storefront web page; and
the daypart guide is a storefront web page.

10. A method as described in claim 1, wherein:
the video storefront is a markup language page; and
the daypart guide is a markup language page.

11. A method as described in claim 1, wherein the ad element contains objects selected from the group consisting of a title, a textual description, an image associated with the multimedia program corresponding thereto, and a combination thereof.

12. A method as described in claim 1, wherein the transmitting each formed daypart guide to the indicated one or more headends before the indicated time of day of any day during the viewing period further comprises an interactive scheduling routine for each indicated headend, the interactive scheduling routine corresponding to the indicated time of day.

13. A method as described in claim 1, wherein the forming a plurality of daypart guides comprises an interactive scheduling routine for each indicated headend, the interactive scheduling routine corresponding to the indicated time of day.

14. A method as described in claim 1, wherein an interactive scheduling routine comprises selecting from among the ads, for arrangement into a template for each daypart guide, those having a corresponding multimedia program likely to be desirable for viewing by the third party at the indicated time of day.

15. A method as described in claim 1, wherein the forming the plurality of daypart guides includes designing, via an multimedia delivery service provider, the plurality of daypart guides using one or more daypart guide templates.

16. A method as described in claim 1, wherein the indicated time of day is a daypart selected from the group consisting of morning, daytime, early fringe, primetime, late news, late fringe, weekend access, and weekend late night.

17. A method as described in claim 1, wherein the predetermined time of day is a continuous block of time that is not less than fifteen minutes and that is not more than a daypart.

18. A method as described in claim 17, wherein the daypart is selected from the group consisting of morning, daytime, early fringe, primetime, late news, late fringe, weekend access, and weekend late night.

19. A computer readable medium comprising instructions that, when executed by a computer, perform the method of claim 1.

20. A method implemented on a computing device by a processor configured to execute instructions that, when executed by the processor, direct the computing device to perform acts comprising:
   transmitting from a multimedia delivery service provider to content providers:
      requests for multimedia programs that are available for distribution to third parties during a license period; and
      an ad element template that correspond to a template for a daypart guide, the ad element template specifying a desired ad element format associated with a technology capability of a broadcast carousel at a headend of a multisystem operator;
   receiving ad elements from the content providers;
   queuing the received ad elements for approval at the multisystem operator;
   disapproving the ad elements at the queue of the multisystem operator when a format of the ad elements is incompatible with the desired ad element format;
   receiving input from the content providers, the input selecting the network resource, the license period of availability, and the corresponding multimedia programs;
   transmitting to the selected network resource, prior to the corresponding license period of availability, data encoding the selected multimedia programs;
   receiving input from the content providers to form the daypart guide, the input comprising selections of:
      one or more ad elements assembled into the template for the daypart guide;
      a navigational link from each of the one or more selected ad element to a storefront web page for a corresponding selected multimedia program; and
      a predetermined time of day for distributing the formed daypart guide to the third parties;
   transmitting the formed daypart guide to the selected network resource in advance of the predetermined time of day of any day during the corresponding license period of availability of the selected multimedia programs;
   receiving a request for the formed daypart guide from one of the third parties during:
   the predetermined time of day; and
   the corresponding license period of availability of the selected multimedia programs;
      polling a video delivery server for the corresponding selected multimedia program;
      when the polling determines that the corresponding selected multimedia program is resident on the video delivery server, initiating a real time distribution of the formed daypart guide to the one of the third parties from the selected network resource,
   wherein the content providers have ownership rights in the multimedia programs and the license period is a plurality of days during which the content providers grants a distribution right to an owner of the network resource.

21. A method as described in claim 20, further comprising:
   receiving, and the network resource, a request from one of the third parties to the network resource for a real time distribution of one of the multimedia programs, wherein the request is initiated by:
      a first input selecting one of the ad elements in the formed daypart guide;
      responsive to the first input, a transmission to the third party of the storefront web page linked to the selected ad element; and
      a second input making the request from the storefront web page;
   initiating the real time distribution of the requested multimedia program to the one of the third parties from the selected network resource.

22. A method as described in claim 20, further comprising:
   receiving transmissions from a plurality of content providers each including information regarding a plurality of multimedia programs available for real time distribution to third parties during respective license periods; and
   receiving input from one of the third parties to make a request for real time distribution of one of the multimedia programs.

23. A method as described in claim 20, wherein each transmission is performed through the internet.

24. A method as described in claim 20, wherein each multimedia program is selected from the group consisting of a pay per view, a video on demand, and a multimedia advertisement.

25. A method as described in claim 20, wherein the storefront web page contains information regarding the multimedia program, the information selected from the group consisting of:
   a title of the multimedia program;
   the license period;
   a genre;
   a name of the corresponding content provider;
   a studio corresponding to the multimedia program;
   a preview availability for the multimedia program;
   a run time for the multimedia program;
   a type of the multimedia program;
   a value for a box office revenue for the multimedia program;
   a rating value for the multimedia program; and
   a combination of the foregoing.

26. A method as described in claim 20, wherein each multimedia program further comprises a preview of the multimedia program.

27. A method as described in claim 20, wherein:
   the daypart guide is a storefront web page.

28. A method as described in claim 20, wherein:
   the storefront web page is a markup language page; and
   the daypart guide is a markup language page.

29. A method as described in claim 20, wherein each ad element contains objects associated with the multimedia program corresponding thereto, the objects selected from the group consisting of a title, a textual description, an image, and a combination thereof.

30. A method as described in claim 20, wherein the transmitting the formed daypart guide to the selected network resource further comprises transmitting an interactive scheduling routine for the selected network resource that corresponds to the predetermined time of day.

31. A method as described in claim 20, wherein the receiving input to form the daypart guide further comprises receiving an interactive scheduling routine for the selected network resource that corresponds to the predetermined time of day.

32. A method as described in claim 31, wherein the interactive scheduling routine comprises selecting from among the ad elements, for arrangement into the ad elements template for the daypart guide, those ad elements having a corresponding multimedia program likely to be desirable for viewing by the third parties at the predetermined time of day.

33. A method as described in claim 20, wherein:
the selected network resource is selected from the group consisting of:
a carousel;
a headend;
a plurality of headends;
a server;
a production server;
a staging and preview server; and
a combination of the foregoing; and
third parties are selected from the group consisting of:
a client device;
a set top box for cable TV;
a set top box for satellite TV; and
a personal computer.

34. A method as described in claim 20, wherein the predetermined time of day is a daypart.

35. A method as described in claim 34, wherein the daypart is selected from the group consisting of morning, daytime, early fringe, primetime, late news, late fringe, weekend access, and weekend late night.

36. A method as described in claim 20, wherein the predetermined time of day is a continuous block of time that is not less than fifteen minutes and that is not more than a daypart.

37. A method as described in claim 36, wherein the daypart is selected from the group consisting of morning, daytime, early fringe, primetime, late news, late fringe, weekend access, and weekend late night.

38. A computer readable medium comprising instructions that, when executed by a computer, perform the method of claim 20.

* * * * *

UNITED STATES PATENT AND TRADEMARK OFFICE
CERTIFICATE OF CORRECTION

| | | |
|---|---|---|
| PATENT NO. | : 7,716,703 B2 | |
| APPLICATION NO. | : 10/653383 | |
| DATED | : May 11, 2010 | |
| INVENTOR(S) | : Andrew K. Sheldon | |

It is certified that error appears in the above-identified patent and that said Letters Patent is hereby corrected as shown below:

In column 16, line 46, delete "(GOB)" and insert -- (OOB) --, therefor.

Signed and Sealed this
Eighth Day of February, 2011

David J. Kappos
*Director of the United States Patent and Trademark Office*